United States Patent
Sankaranarayanan et al.

(10) Patent No.: US 9,037,549 B2
(45) Date of Patent: May 19, 2015

(54) SYSTEM AND METHOD FOR TESTING DATA AT A DATA WAREHOUSE

(75) Inventors: Saji Valiyattil Sankaranarayanan, Thrissur (IN); Mahesh Gudipati, Karimnagar (IN); Ajay Kumar Kachottil, Kochi (IN); Shyam Balasubramoni Ayyar, Trivandrum (IN); Sreejan Manezhathu Janardhanan, Cochin (IN)

(73) Assignee: Infosys Limited (IN)

( * ) Notice: Subject to any disclaimer, the term of this patent is extended or adjusted under 35 U.S.C. 154(b) by 0 days.

(21) Appl. No.: 13/048,236

(22) Filed: Mar. 15, 2011

(65) Prior Publication Data

US 2012/0150820 A1   Jun. 14, 2012

(30) Foreign Application Priority Data

Dec. 8, 2010   (IN) .............................. 3743/CHE/2010

(51) Int. Cl.
*G06F 17/30* (2006.01)

(52) U.S. Cl.
CPC ................. *G06F 17/30303* (2013.01)

(58) Field of Classification Search
USPC .......................................... 707/690; 717/124
See application file for complete search history.

(56) References Cited

U.S. PATENT DOCUMENTS

| | | | | |
|---|---|---|---|---|
| 6,804,709 | B2* | 10/2004 | Manjure et al. | 709/220 |
| 7,010,546 | B1* | 3/2006 | Kolawa et al. | 707/694 |
| 7,788,241 | B2* | 8/2010 | Cheng et al. | 707/703 |
| 8,032,863 | B2* | 10/2011 | Kolawa et al. | 717/124 |
| 8,078,643 | B2* | 12/2011 | Mush et al. | 707/802 |
| 8,291,387 | B2* | 10/2012 | Pal et al. | 717/126 |
| 2006/0206870 | A1* | 9/2006 | Moulden et al. | 717/124 |
| 2007/0174069 | A1* | 7/2007 | Moore et al. | 705/1 |
| 2008/0052141 | A1* | 2/2008 | Olsson et al. | 705/7 |
| 2009/0150447 | A1* | 6/2009 | Anderson et al. | 707/200 |
| 2009/0171991 | A1* | 7/2009 | Gitai et al. | 707/100 |
| 2009/0199047 | A1* | 8/2009 | Vaitheeswaran et al. | 714/47 |
| 2009/0307763 | A1* | 12/2009 | Rawlins et al. | 726/5 |
| 2010/0306591 | A1* | 12/2010 | Krishna | 714/35 |

* cited by examiner

*Primary Examiner* — Sherief Badawi
*Assistant Examiner* — Christopher J Raab
(74) *Attorney, Agent, or Firm* — Lerner, David, Littenberg, Krumholz & Mentlik, LLP

(57) ABSTRACT

A system and method for performing testing of data at a data warehouse is provided. The methodology of the invention describes steps to develop and further invoke one or more data quality-accuracy test cases from a framework. The data quality-accuracy test cases check the sanity of the data stored at the data warehouse. The one or more data quality-accuracy test cases are developed based on at least one predefined strategy, which in turn are stored in the framework. The methodology further executes the developed one or more data quality-accuracy test cases as either batch or independently, based on the requirements of the test. Thereafter, the methodology maintains traceability of the executed test at the data warehouse, incorporating details from the development of the one or more data quality-accuracy test cases to the final output of the test.

23 Claims, 21 Drawing Sheets

| Select Table(s) | | | | Selected Tables Cart | | | |
|---|---|---|---|---|---|---|---|
| | | | | | Schema | Database | Table | Remove |
| "ACCOUNT_TYPES" | | | | Oracle Server | "BANK_PROD_DB" | "CUSTOMERS" | Remove |
| "ACCOUNTS" | | | | Oracle Server | "BANK_PROD_DB" | "ACCOUNTS" | Remove |
| "BRANCHES" | | | | Oracle Server | "BANK_PROD_DB" | "ACCOUNT_TYPES" | Remove |
| "CREDIT_CARD_TYPE" | | | | | | | |
| "CREDIT_CARDS" | | | | | | | |
| "CUSTOMERS" | | | | | | | |

Select Validation(s)

☑ Primary Key check   ☑ Foreign Key check
☑ Data type check    ☑ Nullable check

[Add to cart]   [Reset]

Schema :   [Oracle Server ▼]   [+]
Database : ["BANK_PROD_DB" ▼]

Operations | Operation Cart

Schema: Oracle Server | ▼    Database: BANK_PROD_DB | ▼    Table: ACCOUNTS | ▼

Column Statistics | Outliers Check | Uniqueness Check

Column Statistics

Select Column(s)

- ACCOUNT_NUMBER, VARCHAR2
- CUSTOMER_ID, VARCHAR2
- BRANCH_CD, VARCHAR2
- ACCOUNT_OPENING_DT, DATE
- LAST_TRANSACTION_DT, DATE
- CURRENT_BALANCE, NUMBER
- MIN_BALANCE, NUMBER
- ACCOUNT_TYPE_CD, VARCHAR2

Select Function(s)

| ☑ Min Value | ☐ Max value |
| ☑ Min Length | ☐ Max Length |
| ☐ Sum | ☐ Average |
| ☐ Count | ☐ Blank Count |
| ☐ Null Count | |

Data Quality Analyser
Statistical Analysis Report
Summary

| | |
|---|---|
| Start time | Fri Oct 22 18:25:27 GMT+05:30 2010 |
| End time | Fri Oct 22 18:25:28 GMT+05:30 2010 |
| Total time taken | 0.59sec |
| Total Checks | 4 |
| Column Statistics | 2 |
| Outliers Check | 1 |
| Uniqueness Check | 1 |

FIG. 9

| Select | Relationship Cart | | |
|---|---|---|---|
| Schema: Oracle Server |▼| Database: BANK_PROD_DB |▼|

*{PK} = Primary Key*
*{FK} = Foreign Key*

Parent Table: ACCOUNTS |▼|

*Click on a column to select*

| Columns | Constraints | Datatype |
|---|---|---|
| ACCOUNT_NUMBER | [PK] | VARCHAR2 |
| CUSTOMER_ID | [PK][FK] | VARCHAR2 |
| BRANCH_CD | [FK] | VARCHAR2 |
| ACCOUNT_OPENING_DT | | DATE |
| LAST_TRANSACTION_DT | | DATE |
| CURRENT_BALANCE | | NUMBER |
| MIN_BALANCE | | NUMBER |
| ACCOUNT_TYPE_CD | [FK] | VARCHAR2 |

Child Table: ACCOUNTS_TYPES |▼|

*Click on a column to select*

| Columns | Constraints | Datatype |
|---|---|---|
| ACCOUNT_TYPE_CD | [PK] | VARCHAR2 |
| DESCRIPTION | | VARCHAR2 |

Select cardinality  ○ 1:1   ● 1:M   ○ 0:M

FIG. 10

Data Quality Analysis
Relationship Analysis
Summary

| | |
|---|---|
| Start time | Fri Oct 22 18:29:41 GMT+05:30 2010 |
| End time | Fri Oct 22 18:29:42 GMT+05:30 2010 |
| Total time taken | 0.53sec |

| Sl. No | Schema Name | Database Name | Parent Table Name | Parent Column Name | Child Table Name | Child Column Name | Cardinality | Parent Count | Child Count | Parent Without Child | Child Without Parent | Parent Null Count | Child Null Count | Parent Duplicates | Child Duplicates |
|---|---|---|---|---|---|---|---|---|---|---|---|---|---|---|---|
| 1 | Oracle Server | "BANK_PROD_DB" | "ACCOUNTS" | "CUSTOMER_ID" | "CUSTOMERS" | "CUSTOMER_ID" | 1 : M | 5008 | 3000 | - | 0 | 0 | 0 | 2000 | - |
| 2 | Oracle Server | "BANK_PROD_DB" | "ACCOUNTS" | "ACCOUNT_TYPE_CD" | "ACCOUNT_TYPES" | "ACCOUNT_TYPE_CD" | 1 : M | 5008 | 6 | - | 0 | 0 | 0 | 6 | - |

FIG. 11

Pattern Description

Start with '000'

Schema: Oracle Server [*]
Table: ACCOUNTS [*]
Database: BANK_PROD_DB [*]

Available Columns
- ACCOUNT_NUMBER
- CUSTOMER_ID
- BRANCH_ID
- ACCOUNT_OPENING_DT
- LAST_TRANSACTION_DT
- CURRENT_BALANCE

Selected Columns
- ACCOUNT_NUMBER

＋ ✗

Select Pattern | Pattern Cart

Available Patterns
- Account no format 000XXXX
- Sample Pattern
- IP
- PASSWORD
- E-MAIL
- ZIP CODE – INDIA
- ZIP CODE – US
- MONTHS

Pattern Description
Pattern to check if bank account number is of format 000XXXX

FIG. 12

Data Quality Analysis

Pattern Analysis

Summary

| | |
|---|---|
| Start time | Fri Oct 22 18:50:39 GMT+05:30 2010 |
| End time | Fri Oct 22 18:50:40 GMT+05:30 2010 |
| Total time taken | 0.94sec |

| Sl. No | Pattern Name | Pattern Description | Pattern Type | Pattern | Schema | Status | Database | Table | Column | Total Count | Match Count | Mismatch Count | % Mismatch |
|---|---|---|---|---|---|---|---|---|---|---|---|---|---|
| 1 | E-MAIL | Matches an email id. Matches: user@infosys.com Non-Matches: userinfosys.com | System Defined | ^([0-9a-zA-Z]([\.\w]*[0-9a-zA-Z])*@[0-9a-zA-Z][-\w]*[0-9a-zA-Z]\.+[a-zA-Z]{2,9})$ | Oracle Server | EXECUTED | "BANK_PROD_DB" | "CUSTOMERS" | "EMAIL" | 3000 | 2808 | 192 | 6.4 |
| 2 | Account no format 000XXXXXX | Pattern to check if bank account number is of format 000XXXXXX | Pre Defined | Start With '000' | Oracle Server | EXECUTED | "BANK_PROD_DB" | "ACCOUNTS" | "ACCOUNT_NUMBER" | 5008 | 5008 | 0 | 0.0 |

FIG. 13

Data Quality Analysis

Business Rules Analysis

Summary

| | |
|---|---|
| Start time | Fri Oct 22 18:54:28 GMT+05:30 2010 |
| End time | Fri Oct 22 18:54:29 GMT+05:30 2010 |
| Total time taken | 0.25sec |

| Sl. No | Schema | Database | Table | Rule Name | Applied Rule | Total Count | Match Count | Mismatch Count | % Mismatch |
|---|---|---|---|---|---|---|---|---|---|
| 1 | Oracle Server | "BANK_PROD_DB" | "ACCOUNTS" | Field greater than a Field comparison | "CURRENT_BALANCE" > 1000 | 5008 | 5007 | 1 | 0.0 |

| | |
|---|---|
| Schema | Oracle Server |
| Database | "BANK_PROD_DB" |
| Table | "ACCOUNTS" |
| Rule Name | Field greater than a Field comparison |
| Applied Rule | "CURRENT_BALANCE" > 1000 |

| "CURRENT_BALANCE" |
|---|
| 887 |

FIG. 15

TEST EXECUTION REPORT - SUMMARY

| | |
|---|---|
| Test case name | TC_0001 |
| Test case description | Exhaustive verification sample |
| Execution Start Time | Fri Oct 22 19:03:31 GMT+05:30 2010 |
| Execution End Time | Fri Oct 22 19:03:36 GMT+05:30 2010 |
| Total Execution Time | 5422 |
| Status | FAIL |

| Test Step Name | Step Description | Expected Result |
|---|---|---|
| Record count verification | Record count verification. Verify that source and target record counts are equal | Source and target record count should be equal |
| Key column comparison | Key column comparison. Verify that source records are moved to target | All records should be moved from source to target |
| Field-level comparison | Field-level comparison. Verify that source and target field data match | Source and target field data should match |

| Alias Name | Source Column Name | Target Column Name |
|---|---|---|
| BALANCE | "SOURCE_DB"."SOURCE_TABLE"."BALANCE" | "TARGET_DB"."TARGET_TABLE"."BALANCE" |
| ACCOUNT_NUMBER | CONCAT((SUBSTR("SOURCE_DB"."SOURCE_TABLE"."BRANCH_C D",3,5)),"SOURCE_DB"."SOURCE_TABLE"."ACCOUNT_NUMBER") | "TARGET_DB"."TARGET_TABLE"."ACCOUNT_NUMBER" |

| Report Type | Total Records | Status |
|---|---|---|
| Source Records | 100000 | generated |
| Target Records | 9792 | generated |
| Matching Records | 9790 | generated |
| Mismatch Records | 2 | abandoned |
| Keys Present only in Source | 10000 | generated |
| Keys Present only in Target | 0 | generated |
| Duplicate Keys in Source | 0 | generated |
| Duplicate Keys in Target | 0 | |

FIG. 17

TEST EXECUTION REPORT - SUMMARY

| Test case name | TC_0002 |
|---|---|
| Test case description | Aggregation strategy sample |
| Execution Start Time | Fri Oct 22 19:11:22 GMT+05:30 2010 |
| Execution End Time | Fri Oct 22 19:11:22 GMT+05:30 2010 |
| Total Execution Time | 375 |
| Status | PASS |

| Test Step Name | Step Description | Expected Result |
|---|---|---|
| Execute Source Query | Execute the source query and fetch the results. | The query should be executed successfully |
| Execute Target Query | Execute the target query and fetch the results. | The query should be executed successfully |
| Compare Aggregate Data | Compare aggregate data in source with target | Source and target aggregate data should match |

| Aggregation | Source Column | Source Value | Target Value | Target Column |
|---|---|---|---|---|
| COUNT | "BANK_PROD_DB"."ACCOUNTS"."ACCOUNT_NUMBER" | 5008 | 5008 | "BANK_PROD_DB"."ACCOUNTS"."ACCOUNT_NUMBER" |

FIG. 19

SYSTEM AND METHOD FOR TESTING DATA AT A DATA WAREHOUSE

FIELD OF INVENTION

The present invention relates to data warehouse. More particularly, the present invention provides a framework to perform data testing at a data warehouse.

BACKGROUND OF THE INVENTION

Globalization of local businesses has resulted in a fierce competition between organizations to capture market share in a constrained global market. Companies today rely on various available data to make analytical and calculated business decisions required to maintain and increase its presence in the market. The data created/employed by a company or its branches is collectively stored at a central data warehouse. The data warehouse is a repository which stores the entire collection of current and historical data related to a company. In order to perform analysis of complex business decisions, the data stored at the data warehouse is tested for any erroneous datum using various data testing techniques. The error free data helps in making right business decisions critical for an organization.

Further, the data stored at the data warehouse is extracted from one or more databases, which are located at various branches of the organization. To efficiently store the extracted data, at the data warehouse, a process called Extract, Transfer, and Load (ETL) is used. The ETL defines a three stage process of extracting data from the one or more sources, transforming the data and subsequently storing it at the data warehouse. The extracted data is transformed using a series of transformation rules and functions to derive the required data based on the functional requirements of a business. Thereafter, the transformed data is loaded in the data warehouse for further usage. To maintain the sanity of data at the data warehouse a data quality-accuracy test is applied on the data stored at the data warehouse.

Presently, the data quality-accuracy test employs at least one of a data quality analysis test to check the attributes of the data stored at a data warehouse and a data comparison test to check the accuracy of the data stored at a data warehouse. The data quality analysis test is performed by comparing various functional attributes, such as definition of columns of respective data, patterns of respective data and so forth, of the data warehouse data (DWH data) and the sample data (data generated to perform the test). The DWH data is the data stored at the data warehouse, which in turn is derived by ETL process (as explained earlier). The sample data is derived from the one or more sources/databases after applying the same transformation logic that was used while storing data in the data warehouse (DWH data).

The data comparison test involves comparison of the DWH data to the sample data for a specific test case. For both the testing techniques i.e. data comparison test and data quality analysis test, a tester creates specific test cases. Further, the tester is required to develop specific scripts to extract and thereafter compare respective values, which is an expensive methodology in terms of both cost and effort. In addition, the entire data set stored at the data warehouse cannot be efficiently verified because of the huge amount of data (stored at the data warehouse).

Moreover, the tester is required to possess the knowledge of various databases, query languages, and scripting languages, to write scripts to design and execute respective test cases for performing testing of data at the data warehouse.

Furthermore, due to the lack of any centralized testing system, the tester has to develop individual test cases for every data set from scratch, which results in wastage of time and effort.

Additionally, the tester utilizes various spreadsheets, such as Microsoft (MS) Excel and Perl Scripts, to compare the DWH data with the sample data while performing data quality-accuracy analysis which is quite tedious. In case, there are more than 65,536 rows of data to be compared, the tester has to write complex scripts for implementing the ETL comparison which in turn results in increase in effort and time required from the specialized tester.

In light of the abovementioned disadvantages, there is a need for a framework which provides an interface to develop and perform data quality analysis testing and data comparison testing at a data warehouse with minimal manual intervention and increased efficiency.

SUMMARY OF THE INVENTION

A system and method for testing data at a data warehouse is provided. In an embodiment of the present invention, the step to test data at a data warehouse includes receiving one or more testing requirements from a tester. The one or more testing requirements inputted by the tester define at least one attribute of the test. Thereafter, one or more test cases are developed based on the received one or more testing requirements and one or more predefined strategies. After which, the created one or more test cases are executed based on at least one predefined execution rule. Subsequently, a report is generated, which encompasses the output of the end to end testing of data at the data warehouse.

In an embodiment of the present invention, the step to develop one or more test cases further includes identifying the type of test case to be developed based on the received one or more testing requirements. Thereafter, at least one of a comparison test case and a data quality analysis test case is developed based on the identified type.

In an embodiment of the present invention, the one or more strategies include at least one of data quality analysis strategies and data comparison strategies.

In an embodiment of the present invention, the data quality analysis strategies include at least one of a metadata analysis strategy, a relationship analysis strategy, a statistical analysis strategy, a pattern analysis strategy, and a business rules based strategy.

In an embodiment of the present invention, the data comparison strategies include at least one of an exhaustive verification strategy, a sampling strategy, and an aggregation strategy.

In an embodiment of the present invention, the step to execute the one or more test cases further includes identifying at least one predefined execution rule of the developed one or more test cases based on the received one or more testing requirements. After which, the one or more test cases are executed either as a batch or independently based on the identified at least one predefined execution rule.

In an embodiment of the present invention, the report generated outlines the information related to execution of steps and the output corresponding to each step involved in the end to end testing of data at the data warehouse.

In an embodiment of the present invention, the report generated is stored externally in a format selected from a group comprising of a HyperText Markup Language (HTML) format, an Extensible Markup Language (XML) format, and a Microsoft (MS) Excel format.

In an embodiment of the present invention, the step to generate the report further includes creating a summary of the end to end testing of data at the data warehouse. The summary not only highlights the output of the one or more test cases executed at the data warehouse but also identifies any error encountered during the execution of the one or more test cases.

In an embodiment of the present invention, the step to test data at a data warehouse includes receiving one or more testing requirements from a tester. The one or more testing requirements define at least one attribute of the test. After which, at least one of a data quality analysis test case and a data comparison test case is developed, based on the received one or more testing requirements and one or more predefined strategies. Thereafter, the created at least one of a data quality analysis test case and a data comparison test case is executed based on at least one predefined execution rule. Subsequently, a report is generated, which encompasses the output of the end to end testing of data at the data warehouse.

In an embodiment of the present invention, the system for performing end to end testing of data at a data warehouse includes a test life cycle component, a strategy component and a test automation component. The test life cycle component is configured to design at least one test case based on one or more testing requirements defined by a tester. The strategy component is configured to define the methodology of the at least one test case, based on the received one or more testing requirements. The test automation component is configured to generate a plurality of scripts to execute the developed at least one test case at the data warehouse.

In an embodiment of the present invention, the test life cycle component, configured to design at least one test case, further comprises a requirement management module, a test case design module, a test execution module, a reporting module and a traceability module. The requirement management module is configured to receive the one or more testing requirements for performing end to end testing of data at a data warehouse. The test case design module is configured to enable the tester to design at least one test case based on the one or more testing requirements. The test execution module is configured to execute the designed at least one test case based on the one or more testing requirements. The reporting module is configured to generate a report comprising the output of the executed at least one test case. The traceability module is configured to maintain a detailed report encompassing the output of the end to end testing of data at the data warehouse.

In an embodiment of the present invention, the test execution module is further configured to identify an execution type of the at least one test case as either batch or independently.

In an embodiment of the present invention, the strategy component, configured to define the methodology of the at least one test case, further comprises a data comparison strategy component and a data quality analysis strategy component. The data comparison strategy component is configured to define methodology of the at least one test case, wherein the at least one test case is defined as a data comparison test case, based on the received one or more testing requirements. The data quality analysis strategy component is configured to define methodology of the at least one test case, wherein the at least one test case is defined as a data quality analysis test case, based on the received one or more testing requirements.

In an embodiment of the present invention, the data comparison strategy component comprises at least one of an exhaustive verification strategy, a sampling strategy, and an aggregation strategy.

In an embodiment of the present invention, the data quality analysis strategy component comprises at least one of a metadata analysis strategy, a relationship analysis strategy, a statistical analysis strategy, a pattern analysis strategy and a business rules based strategy.

In an embodiment of the present invention, the test automation component, configured to generate a plurality of scripts to execute the developed at least one test case, further comprises a query builder, a business rule builder, a data comparison module, a test data generator module, a data quality analyzer module, an execution engine and a reporting engine. The query builder is configured to create one or more scripts for executing the at least one test case at the data warehouse. The business rule builder is configured to define a business rule for checking the validity of the data at the data warehouse. The data comparison module is configured to compare the data stored at the data warehouse to a sample data for verifying the accuracy of the data. The test data generator module is configured to generate the sample data with the help of one or more transformation logic, wherein the sample data is used to identify error in the data stored at the data warehouse. The data quality analyzer module is configured to analyze the quality of the data stored at the data warehouse. The execution engine is configured to execute the at least one test case based on a predefined execution rule, wherein the predefined execution rule is assigned by the tester. The reporting engine is configured to generate a result, which encapsulates the output of the executed at least one test case at the data warehouse.

BRIEF DESCRIPTION OF THE DRAWINGS

The present invention is described by way of embodiments illustrated in the accompanying drawings wherein:

FIG. 6 is a screenshot illustrating an interface to develop a data quality analysis test case using a metadata analysis strategy, in accordance with an exemplary embodiment of the present invention;

FIG. 7 is a screenshot illustrating the output of a data quality analysis test case executed at the data warehouse, wherein the test case uses metadata analysis strategy, in accordance with an exemplary embodiment of the present invention;

FIG. 8 is a screenshot illustrating an interface to develop a data quality analysis test case using a statistical analysis strategy, in accordance with an exemplary embodiment of the present invention;

FIG. 9 is a screenshot illustrating the output of a data quality analysis test case executed at the data warehouse, wherein the test case uses statistical analysis strategy, in accordance with an exemplary embodiment of the present invention;

FIG. 10 is a screenshot illustrating an interface to develop a data quality analysis test case using a relationship analysis strategy, in accordance with an exemplary embodiment of the present invention;

FIG. 11 is a screenshot illustrating the output of a data quality analysis test case executed at the data warehouse, wherein the test case uses relationship analysis strategy, in accordance with an exemplary embodiment of the present invention;

FIG. 12 is a screenshot illustrating an interface to develop a data quality analysis test case using a pattern analysis strategy, in accordance with an exemplary embodiment of the present invention;

FIG. 13 is a screenshot illustrating the output of a data quality analysis test case executed at the data warehouse, wherein the test case uses pattern analysis strategy, in accordance with an exemplary embodiment of the present invention;

FIG. 15 is a screenshot illustrating the output of a data quality analysis test case executed at the data warehouse, wherein the test case uses business rules based strategy, in accordance with an exemplary embodiment of the present invention;

FIG. 17 is a screenshot illustrating the output of a data quality analysis test case executed at the data warehouse, wherein the test case uses exhaustive verification strategy, in accordance with an exemplary embodiment of the present invention;

FIG. 19 is a screenshot illustrating the output of a data quality analysis test case executed at the data warehouse, wherein the test case uses aggregation strategy, in accordance with an exemplary embodiment of the present invention.

DETAILED DESCRIPTION

A system and method to perform testing of data at a data warehouse is provided. The invention facilitates a framework to develop one or more test cases to perform data comparison test and data quality analysis test at a data warehouse, based on the requirements of the test. Further, the invention facilitates execution of the one or more developed test cases either independently or in a batch, based on the requirements of the test (testing of data at the data warehouse). The invention enables a tester to develop one or more test cases by providing him with various predetermined tools and predefined strategies, which in turn reduces the time and effort of the tester to perform the respective test. Furthermore, the invention provides end to end testing solution for data at a data warehouse and maintains traceability of the test from the development of the one or more test cases to the final output of the test.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
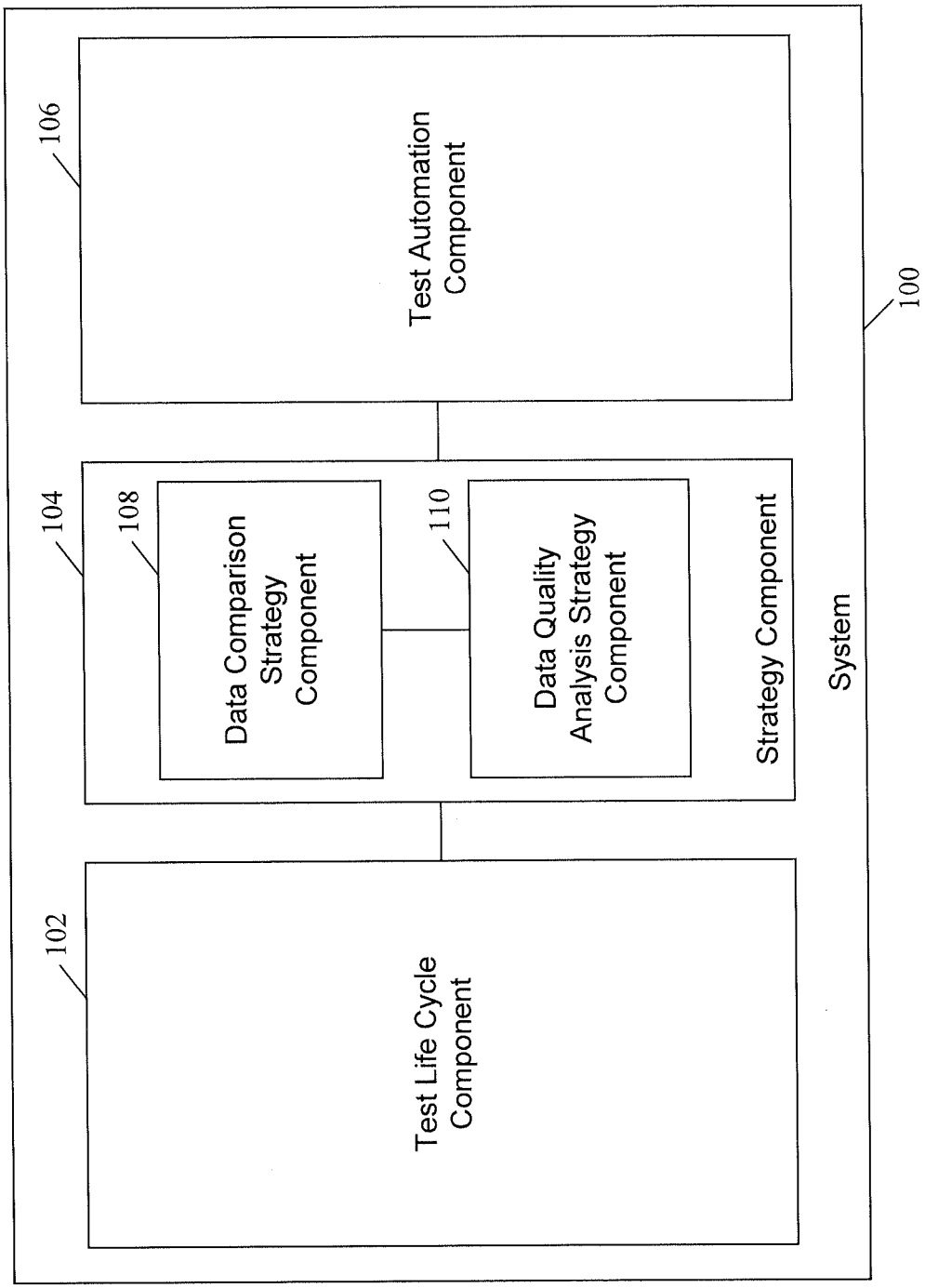
FIG. 1 is a block diagram of a framework employed to perform testing of data at a data warehouse, in accordance with an embodiment of the present invention.

FIG. 1 is a block diagram of a system employed to perform testing of data at a data warehouse, in accordance with an embodiment of the present invention.

The System 100 enables a tester to develop a test case employing one or more pre-defined strategies and executes the developed test case based on predefined execution rules, defined by the tester. The System 100 also provides an interface to trace the output of the test case which enables the tester to perform end to end testing of the data in the data warehouse. The System 100 comprises a Test Life Cycle Component 102, a Strategy Component 104, and a Test Automation Component 106.

In an embodiment of the present invention, the System 100/computing device further includes various computing elements, such as a processor, a memory (such as RAM, ROM, and so forth), one or more I/O peripheral devices, and a display. It may be appreciated by a person skilled in the art that each of the computing elements associated/included with the System 100 enables the Test Life Cycle Component 102, the Strategy Component 104, and the Test Automation Component 106 to perform various computational steps/processes.

The Test Life Cycle Component 102 provides a user interface to develop a test case based on one or more strategies and check the quality and accuracy of the data at the data warehouse. The Test Life Cycle Component 102 enables a tester to perform end to end testing of the data. The end to end testing involves designing of test cases, their execution and saving the output of the test cases for future analysis. The Test Life Cycle Component 102 performs data comparison test and data quality analysis test to maintain the accuracy-quality of the data received from one or more sources/databases. The Test Life Cycle Component 102 is further explained in conjunction with FIG. 2.

The Strategy Component 104 encapsulates one or more strategies, each of which defines a methodology to check the validity of data stored at the data warehouse. In various embodiment of the present invention, the Strategy Component 104 stores pre-defined strategies, which are employed to design a test case. In an embodiment of the present invention various other related strategies may be designed and stored in the Strategy Component 104 based on the requirements of the test. The Strategy Component 104 includes a Data Comparison Strategy Component 108 and a Data Quality Analysis Strategy Component 110.

The Data Comparison Strategy Component 108 comprises pre-installed comparison strategies to identify any difference between the DWH data (data stored at the data warehouse) and the sample data (data generated to perform the test). In various embodiment of the present invention, the DWH data as described earlier is derived through the ETL process. The sample data is derived from the one or more sources/databases after applying the same transformation logic that was used while storing data in the data warehouse (DWH data).

The strategies stored at the Data Comparison Strategy Component 108 include but are not limited to an exhaustive verification strategy, a sampling strategy and an aggregation strategy. In an embodiment of the present invention, the exhaustive verification strategy defines a methodology to perform an exhaustive comparison between the DWH data (stored at the data warehouse) and the sample data. In this methodology the comparison is performed between each datum stored at the data warehouse and the corresponding sample datum (derived from the sample data). The sampling strategy defines the methodology to perform comparison between a selected set of DWH data (stored at the data warehouse) and the corresponding set of sample data. The aggregation strategy defines a methodology to compare the collection of aggregated elements in the DWH data to the collection of aggregated elements in the sample data.

The Data Quality Analysis Strategy Component 110 comprises pre-installed strategies to analyze the quality of data stored at the data warehouse. The Data Quality Analysis Strategy Component 110 includes but is not limited to a metadata analysis strategy, a relationship analysis strategy, a statistical analysis strategy, a pattern analysis strategy and a business rules based strategy. In an embodiment of the present invention, the metadata analysis strategy defines a methodology to verify the table and column definitions of the DWH data (data stored at the data warehouse) with the table and column definitions of the sample data.

The statistical analysis strategy defines a methodology to analyze calculated statistics of the DWH data with respect to the calculated statistics of the sample data. For example, statistical functions, such as average, sum, count, min, and max, are applied to the column data of the DWH data and the sample data respectively, to observe differences between the two sets of data.

The relationship analysis strategy defines a methodology to identify cardinality of the DWH data and subsequently identify the 'orphans' in the DWH data. For example, it identifies the number of parent and child relationship elements at the DWH data, wherein an element referring to another element at the data warehouse is called a 'child', and the element being referred to is called a 'parent'. The identified child and parent relationship of the DWH data are subsequently compared to those of the sample data for verifying consistency.

The pattern analysis strategy defines a methodology to identify the format of the DWH data (data stored in the data warehouse) and compare the identified data format with a pre-identified data format. For example, datum corresponding to an email address should be in the form of xyz@abc.com. Various pre-identified formats relating to email address, zip code, phone number, date, currency and so forth are pre-stored in the Data Quality Analysis Strategy Component 110.

The business rules based strategy checks data compliance of the DWH data with respect to a pre-defined business rule/condition. In an exemplary embodiment of the present invention, a business rule is defined to ascertain invoice number stored at the data warehouse with serial number ranging from 100 to 500. Therefore, the invoices with serial number ranging from 100 to 500 are identified and tallied with the corresponding information derived from the sample data to ascertain any inconsistency. It may be apparent to a person skilled in the art that a tester may modify one or more predefined sub-strategies based on the requirement of a test project.

The Test Automation Component 106 is configured to automate the creation and execution of one or more test cases in conjunction with the Test Life Cycle Component 102, wherein, the one or more test cases are developed to perform testing of data at the data warehouse. Once a tester creates a test case with the help of the Test Life Cycle Component 102, the Test Automation Component 106 creates scripts to execute the test case. Additionally, the Test Automation Component 106 processes the test case at the data warehouse, based on the requirements of the data quality-accuracy test. After processing of the test case at the data warehouse the Test Automation Component 106 generates a report encompassing the result of the processed test case. The Test Automation Component 106 is further explained in details in conjunction with FIG. 3.

Figure 2:
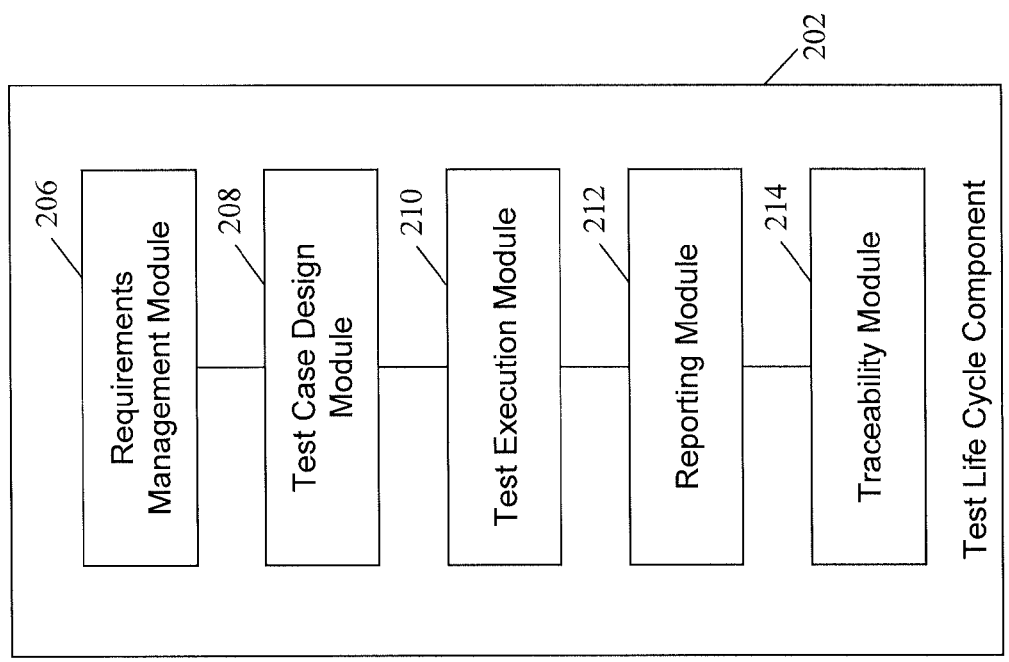
FIG. 2 is a detailed block diagram of a test life cycle component, in accordance with an embodiment of the present invention.

FIG. 2 is a detailed block diagram of a test life cycle component, in accordance with an embodiment of the present invention.

The Test Life Cycle Component 202 enables a tester to develop and manage end to end testing of data at the data warehouse. In an embodiment of the present invention, the tester is presented with an interactive user interface by the Test Life Cycle Component 202 to input the requirements for the testing of the data at the data warehouse. After which, the Test Life Cycle Component 202 in conjunction with the Strategy Component 104 (FIG. 1) enables the tester to design a test case, wherein a test case is a set of variables and programs designed to ascertain the accuracy of the DWH data (data stored at the data warehouse). Subsequently, the Test Life Cycle Component 202 executes the developed test case in conjunction with Test Automation Component 106 (FIG. 1) at the data warehouse. After the test case created by the tester is executed, the Test Life Cycle Component 202 presents the output of the test case to the tester. In addition, the Test Life Cycle Component 202 enables a tester to store the report encompassing details from the creation of the test case to the output of the executed test case. The Test Life Cycle Component 202 comprises a Requirements Management Module 206, a Test Case Design Module 208, a Test Execution Module 210, a Reporting Module 212 and a Traceability Module 214.

The Requirements Management Module 206 receives one or more requirements from a tester to design a test case. Correspondingly, the received one or more requirements are saved in a predefined format/template. In an embodiment of the present invention, the predefined format is Test Management Tool compatible. In another embodiment of the present invention, HP Quality Center can be used as a Test Management Tool. The Requirements Management Module 206 helps the tester to maintain the test requirements traceability in conjunction with the Traceability Module 214. In an exemplary embodiment of the present invention, the requirements received from a test may be at least one of a description of the test case to be created, definition of the strategy to be applied and so forth.

The Test Case Design Module 208 enables a tester to model various test cases to ascertain the validity of the data stored at the data warehouse. The Test Case Design Module 208 in conjunction with the Strategy Component 104 (FIG. 1) provides the tester various pre-defined strategies to develop a test case for comparing the DWH data (stored at the data warehouse) and the sample data and for analyzing the quality of the DWH data. In an embodiment of the present invention, the pre-defined strategies for data comparison test include but are not limited to an exhaustive verification strategy, a sampling strategy, and an aggregation strategy. Additionally, the pre-defined strategies for data quality analysis test include but are not limited to metadata analysis strategy, relationship analysis strategy, statistical analysis strategy, pattern analysis strategy and business rules based strategy. The strategies for both data comparison test and data quality analysis test are further explained in conjunction with FIG. 1.

The Test Execution Module 210 executes the test case developed at the Test Case Design Module 208. In an embodiment of the present invention, after the test case is developed at the Test Case Design Module 208, the Test Execution Module 210 provides the tester an option to either execute the test case independently or as a batch. The tester at the Test Execution Module 210 is further enabled to link the developed test case to other pre-defined test cases to form a batch. The other pre-defined test cases are selected on the basis of type, functionality or output of the test. Furthermore, the batch test can be executed as a batch file, i.e. it can be executed based on a pre-determined condition/trigger (such as a pre-defined time and external response).

The Reporting Module 212 creates a report incorporating the output of the data accuracy-quality test performed at the data warehouse. In an embodiment of the present invention, after execution of the developed test case, the Reporting Module 212 creates a detailed report, which includes the execution details of each of the test cases invoked at the data warehouse and the corresponding output of each of the test cases processed at the data warehouse. The tester is further enabled to save the created detailed report in multiple formats including but not limited to Hypertext Markup Language (HTML), Extensible Markup Language (XML) and Microsoft (MS) Excel. Furthermore, the Reporting Module 212 creates a summary report highlighting an overview of the test performed at the data warehouse, wherein the summary report is enabled to store in the Test Management Tool for future reference.

The Traceability Module 214 maintains end to end information/data corresponding to a data quality-accuracy test performed at the data warehouse, i.e. information including the received requirements of the test to the final output of the executed test case. In an embodiment of the present invention, the Traceability Module 214 provides a complete overview of the test performed at the data warehouse. The Traceability Module 214 includes information of the action performed by each of the modules included in the Test Life Cycle Component 202. The Traceability Module 214 can further be synced with various Test Management tools, such as the HP Quality Center, to maintain a complete traceability report of all the test cases performed at the corresponding data warehouse.

Figure 3:
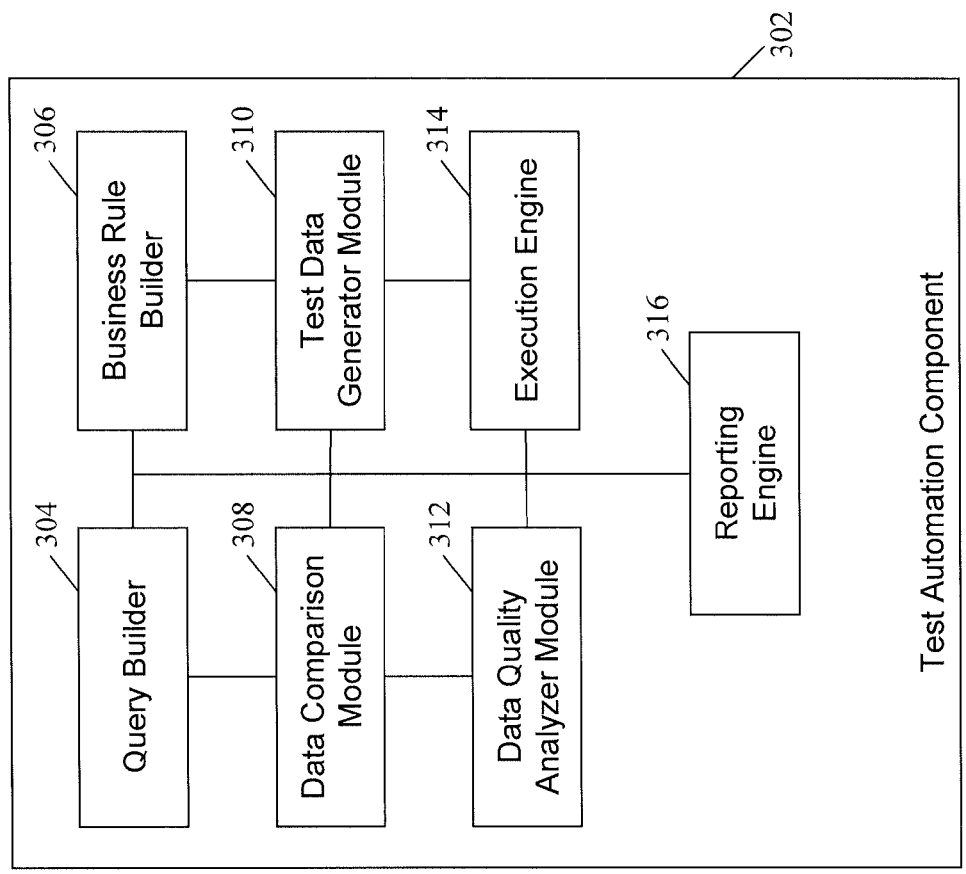
FIG. 3 is a detailed block diagram of a test automation component, in accordance with an embodiment of the present invention.

FIG. 3 is a detailed block diagram of a test automation component, in accordance with an embodiment of the present invention.

The Test Automation Component 302 enables a tester to develop and subsequently execute at least one of a data comparison test and a data quality analysis test at a data warehouse. The Test Automation Component 302 includes a Query Builder 304, a Business Rule Builder 306, a Data Comparison Module 308, a Test Data Generator Module 310, a Data Quality Analyzer Module 312, an Execution Engine 314, and a Reporting Engine 316.

The Query Builder 304 creates one or more scripts to execute various test cases for performing testing of the data at the data warehouse. In an embodiment of the present invention, the Query Builder 304 utilizes one or more business rules pre-stored in the Business Rules Builder 306 to generate the one or more scripts required for executing various test cases. In an embodiment of the present invention, the Query Builder 304 creates a script to compare DWH data (data derived from the data warehouse) to the sample data. In an exemplary embodiment of the present invention, the script created at the Query Builder 304 may be in Structured Query Language (SQL). In an exemplary embodiment of the present invention, the query builder generates script to check whether an account is a 'Minor Account', wherein the script checks the 'age' of the account holder.

The Business Rule Builder 306 provides an interface to the tester to create one or more business rules, wherein a business rule defines an operation to check the validity of the data stored at the data warehouse. It may be apparent to a person skilled in the art that various kind of business rule may be created by a tester based on the requirement of the data. Further, one or more pre-defined business rules may be stored in the Business Rule Builder 306. In an embodiment of the present invention, the business rule built at the Business Rule Builder 306 is further used at the Query Builder 304 to generate one or more scripts to execute test cases. In an exemplary embodiment of the present invention, the Business Rule Builder 306 defines the conditional rule for verifying the account holder as minor, such as in case the age of the account holder is less then 18, then the account holder is deemed minor and correspondingly the account associated is a 'Minor Account'.

The Data Comparison Module 308 executes comparison of the DWH data to the sample data. In an embodiment of the present invention, the Data Comparison Module 308 implements one or more pre-defined data comparison strategies, selected from the Data Comparison Strategy Component 108 (FIG. 1), to perform data accuracy test at the data warehouse. The one or more pre-defined data comparison strategies include but are not limited to exhaustive verification strategy, sampling strategy, and aggregation strategy. The one or more pre-defined strategies for data comparison are further explained in conjunction with FIG. 1. In an exemplary embodiment of the present invention, the Data Comparison Module 308 employs the exhaustive verification strategy included in the Data Comparison Strategy Component 108 (FIG. 1), to compare DWH data to the sample data, based on the requirements of the data accuracy test. The Data Comparison Module 308 compares each datum stored at the data warehouse to each datum of the sample data, wherein the sample data is calculated by the Test Data Generator Module 310, to verify the validity of the data stored at the data warehouse.

The Test Data Generator Module 310 generates sample data, which is used to identify error in the data stored at the data warehouse. In an embodiment of the present invention, the sample data is derived from the one or more sources/databases after applying the same transformation logic that was used while loading the data in the data warehouse (DWH data). The transformation logic rules are predefined using the Business Rule Builder 306. In another embodiment of the present invention, the sample data is a temporary data generated to ascertain the validity of DWH data.

The Data Quality Analyzer Module 312 analyzes the quality of the DWH data (data stored at the data warehouse). In an embodiment of the present invention, the Data Quality Analyzer Module 312 employs one or more strategies available in the Data Quality Analysis Strategy Component 110 (FIG. 1) for analyzing the quality of the DWH data. In an embodiment of the present invention, the one or more strategies that are used to analyze the quality of the data at the data warehouse are metadata analysis strategy, relationship analysis strategy, statistical analysis strategy, pattern analysis strategy, and business rules based strategy. The one or more strategies are further explained in conjunction with FIG. 1. It may be apparent to a person skilled in the art that other strategies may be used to analyze the quality of data stored at the data warehouse based on the requirements of the data quality test.

The Execution Engine 314 executes the one or more test cases (developed to compare data at the data warehouse and analyze the quality of the data) independently or as a batch based on the execution details of the respective test cases. In an embodiment of the present invention, the Execution Engine 314 checks the execution details of each test case as defined by a tester and correspondingly executes the test case independently or as a batch (based on a pre-defined trigger). In an exemplary embodiment of the present invention, the execution engine executes the test case by selecting a chunk of data at an instance of time. Therefore, the entire data is broken down into one or more chunks of data, on which the one or more test cases are executed to ascertain the quality of the data. The aggregated result represents the quality-accuracy analysis of the entire data stored at the data warehouse.

The Reporting Engine 316 generates a report encompassing the output of the one or more test cases executed at the data warehouse. The Reporting Engine 316 further prompts the tester to export the report generated (externally) to multiple output formats, including but not limited to Hypertext Markup Language (HTML), Extensible Markup Language (XML) and Microsoft (MS) Excel, with the help of a user interface. Furthermore, the Reporting Engine 316 creates a summary for each of the test cases and stores it locally at the System 100 (FIG. 1) for future reference. In addition, the Reporting Engine 316 uploads the summary report during execution of one or more test cases in a test management system such as HP Quality Center for further analysis.

Figure 4A:
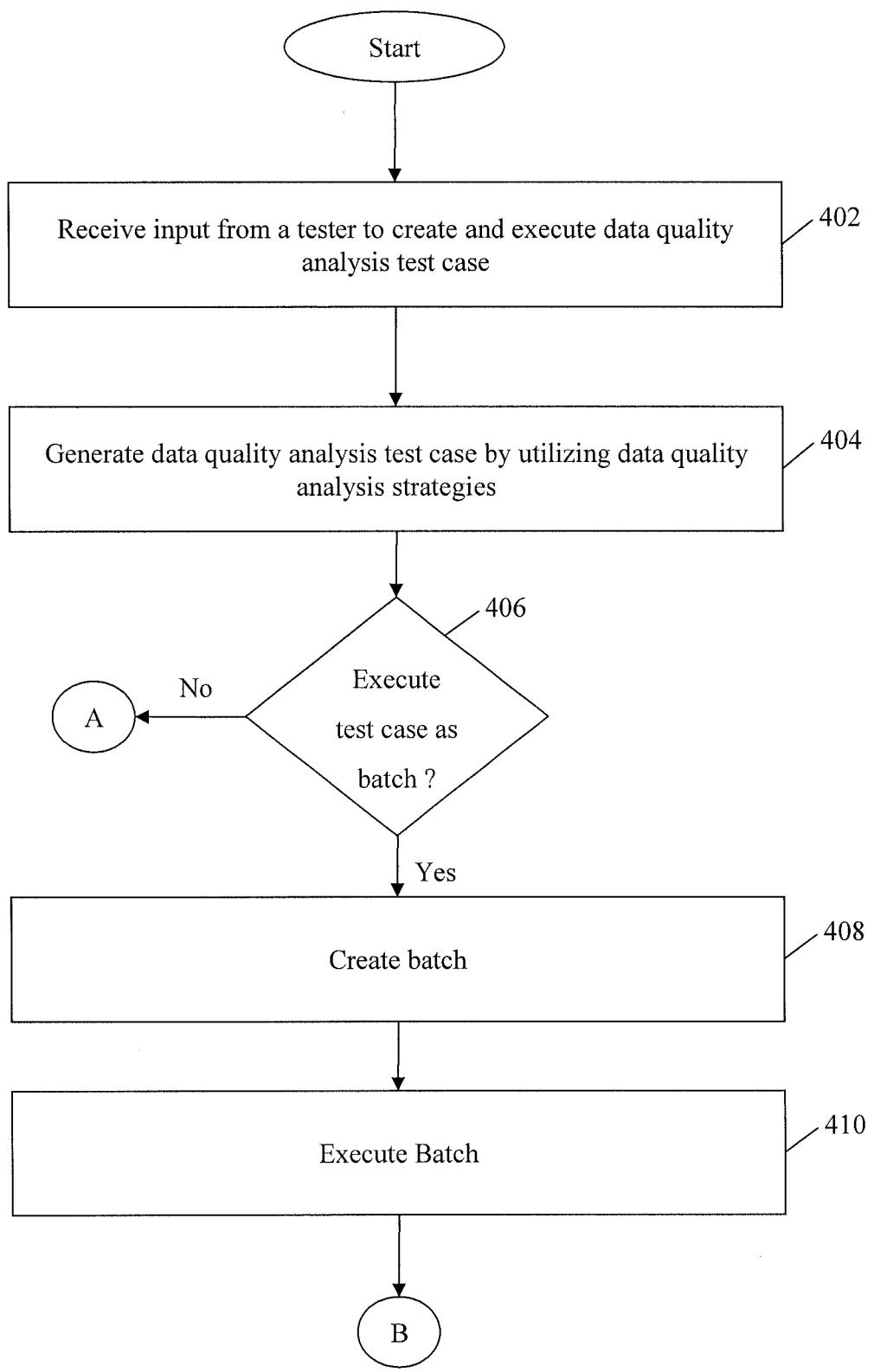
FIGS. 4A and 4B illustrate a flowchart to develop and process a data quality analysis test case at a data warehouse, in accordance with an embodiment of the present invention.
Figure 4B:
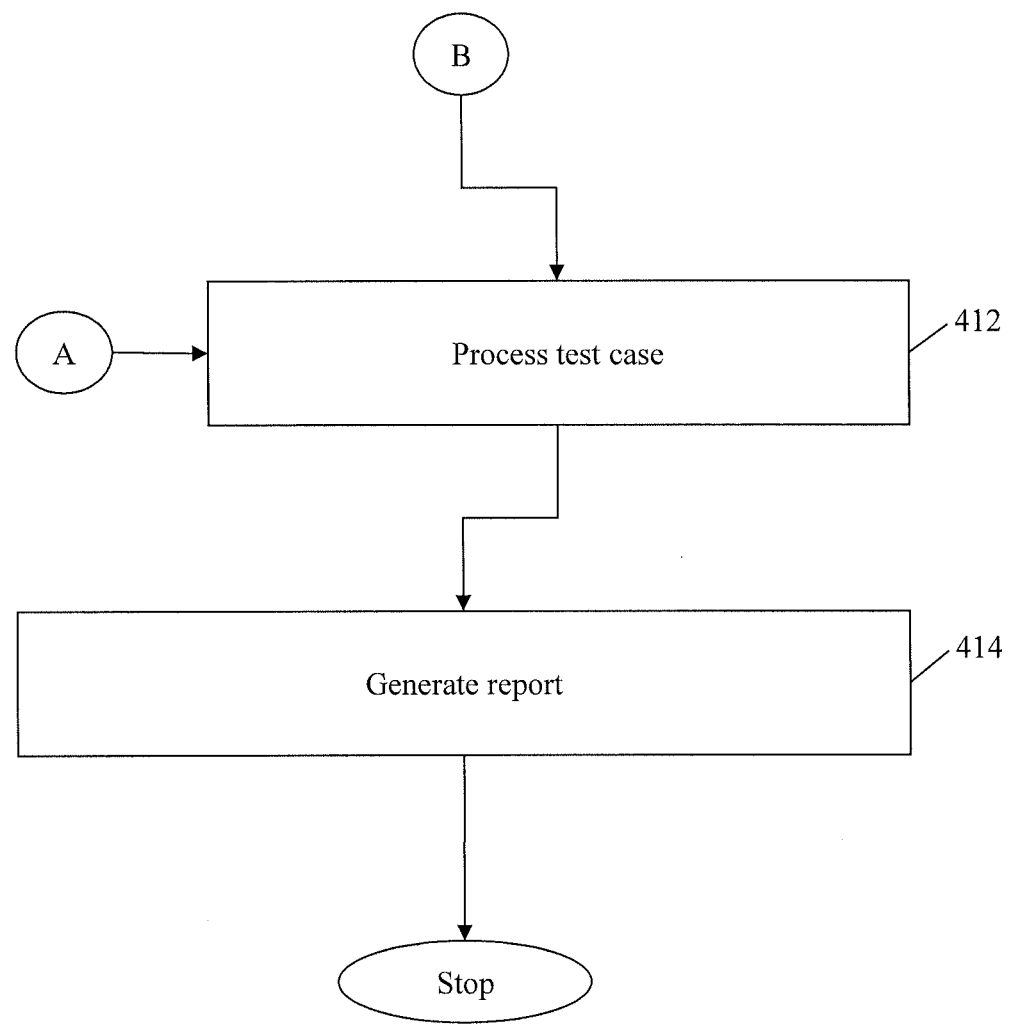

FIGS. 4A and 4B illustrate a flowchart to develop and process a data quality analysis test case at a data warehouse, in accordance with an embodiment of the present invention.

At step 402, input is received from a tester to develop and execute a data quality analysis test case. The tester is provided with a user interface to provide test requirements for performing a data quality analysis test at a data warehouse. In an embodiment of the present invention, the tester submits information related to the DWH data (data stored at the data warehouse) and the required data quality rules. In an exemplary embodiment of the present invention, a tester inputs testing requirement information such as, description of the test case to be generated, name of the test case to be generated and so forth.

At step 404, a data quality analysis test case is generated after receiving the requirements provided by the tester. In an embodiment of the present invention, a data quality analysis test case is generated based on the requirements provided by the tester for testing the data at the data warehouse. The data quality analysis test case is generated using one or more pre-defined data quality analysis strategies. The one or more pre-defined data quality analysis strategies include but are not limited to metadata analysis strategy, relationship analysis strategy, statistical analysis strategy, pattern analysis strategy and business rules based strategy. The one or more pre-defined strategies for data quality analysis are further explained in conjunction with FIG. 1, FIG. 6-FIG. 10. In another embodiment of the present invention, a data quality analysis test case is selected from a data quality analysis test case repository based on the requirements of the test (testing of the data at the data warehouse). The repository includes one or more pre-defined data quality analysis test cases. In an embodiment of the present invention, the tester is enabled to view the developed one or more data quality analysis test case through an interface/browser or through multiple output formats including but not limited to Hypertext Markup Language (HTML), Extensible Markup Language (XML) and Microsoft (MS) Excel. It may be apparent to a person skilled in the art that a test case generated may be customized based on the requirements of the test. Further, a combination of one or more other strategies may be used to develop a test case based on the requirements of the data quality test.

At step 406, a check is performed to ascertain whether the test case is to be processed as a batch. In an embodiment of the present invention, if it is ascertained that the test case is to be processed as a batch, based on the received requirements of the data quality test case, then at step 408 the data quality analysis test case is grouped with one or more data quality analysis test cases to be processed as a batch. In an embodiment of the present invention, the one or more test cases may be similar to each other. Further, the one or more data quality analysis test cases included in the batch may be invoked based on a pre-defined condition, such as a pre-determined time and an external trigger (response from a tester or output of another program). After the batch is created, each of the test case included in the batch is executed based on the pre-defined condition at step 410. Thereafter, each of the executed test cases included in the batch is processed at step 412.

If it is ascertained, that the test case is not to be processed as a batch, then at step 412, the data quality analysis test case is processed directly.

At step 412, the data quality analysis test case is processed. In an embodiment of the present invention, the data quality analysis test case is processed to ascertain the quality of data stored at the data warehouse with respect to the sample data. In an embodiment of the present invention, to process a data quality test case, a test script is created automatically based on the business rules pre-defined at the framework. In another embodiment of the present invention, the test script is executed. After which, a data quality analysis test is conducted on the data stored at the data warehouse, based on the definition of the selected one or more data quality analysis strategies.

In an exemplary embodiment of the present invention, a metadata analysis strategy may be used to perform data quality analysis test. The metadata analysis strategy defines the process to perform data quality analysis test by verifying information related to the definition of the data (table and column definitions) stored at the data warehouse to the information received from the sample data. Further, each of the strategies is explained in conjunction with FIG. 1, FIG. 6-FIG. 10. It may be apparent to a person skilled in the art that a combination of the abovementioned strategies may be applied to perform a data quality analysis at a data warehouse.

At step 414, report of the executed test case is generated. After the data quality analysis test case is processed, a final report is generated to encapsulate the detailed output of the data quality analysis test. In an embodiment of the present invention, the report is further created in at least one of (Microsoft) MS Excel format, Portable Document Format (PDF) format, XML format and HTML format. Furthermore, the tester is enabled to save the generated report manually at an external location. In another embodiment of the present invention, a summary report is also created to highlight overall performance of the data quality analysis test conducted.

Figure 5A:
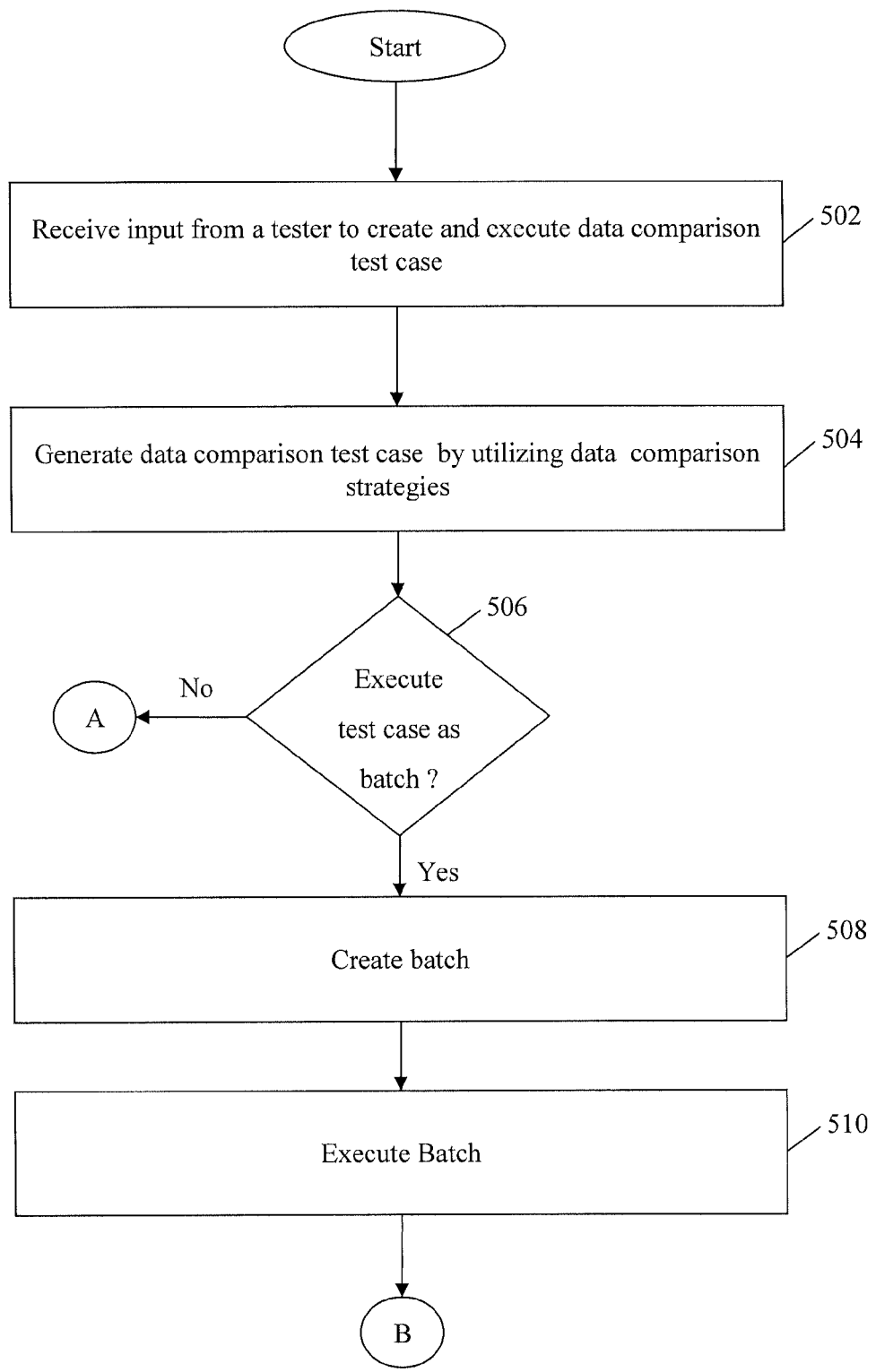
FIGS. 5A and 5B illustrate a flowchart to develop and process a data comparison test case at a data warehouse, in accordance with an embodiment of the present invention.
Figure 5B:
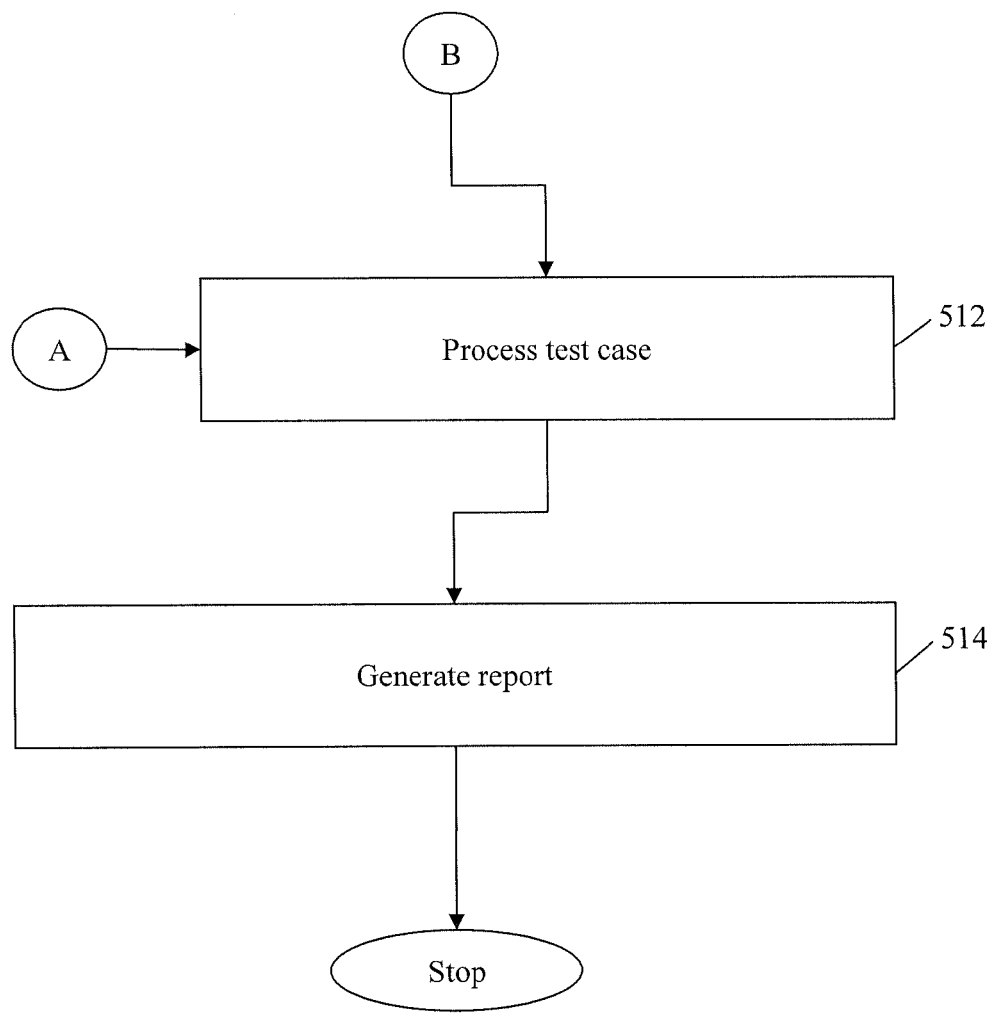

FIGS. 5A and 5B illustrate a flowchart to develop and process a data comparison test case at a data warehouse, in accordance with an embodiment of the present invention.

At step 502, input is received from a tester to develop and execute data comparison test case. The tester is provided with a user interface/front-end interface to provide one or more test requirements for performing a data comparison test at a data warehouse. In an embodiment of the present invention, the tester submits information related to the source data (data derived from one or more sources/databases) and the DWH data (data stored at the data warehouse). In an embodiment of the present invention a tester also provides the metadata information related to a test case.

At step 504, a data comparison test case is generated after receiving the requirements provided by the tester. In an embodiment of the present invention, a data comparison test case is generated using one or more pre-defined data comparison strategies. The one or more pre-defined data comparison strategies include but are not limited to exhaustive verification strategy, sampling strategy, and aggregation strategy. The one or more strategies for data comparison are further explained in conjunction with FIG. 1. In another embodiment of the present invention, a data comparison test case is selected from a data comparison test case repository, which includes one or more pre-defined data comparison test cases. In an embodiment of the present invention, the tester is enabled to view the created one or more data comparison test case either through an interface/browser or through multiple output formats, such as HTML, XML and MS Excel generated file. It may be apparent to a person skilled in the art that a test case generated may be customized based on the requirements of the data comparison test. Further, a collection of one or more other strategies may be used to develop a required test case based on the requirements of the data comparison test.

At step 506, a check is performed to ascertain whether the test case is to be processed as a batch. In an embodiment of the present invention, if it is ascertained that the test case is to be processed as a batch, based on the received requirements of the data comparison test case, then at step 508 the data comparison test case is grouped with one or more data comparison test cases to be processed as a batch. In an embodiment of the present invention, the one or more test cases may be similar to each other. Further, the one or more data comparison test cases included in the batch may be invoked based on a pre-defined condition, such as a pre-determined time and an external trigger (response from a tester or output of another program). After the batch is created, each of the test case included in the batch is executed based on the pre-defined condition at step 510. Thereafter, each of the executed test cases included in the batch is processed at step 512.

If it is ascertained, that the data comparison test case is not to be processed as a batch, then at step 512, the test case is processed directly.

At step 512, the data comparison test case is processed. In an embodiment of the present invention, the data comparison test case is processed to verify the accuracy of data stored at the data warehouse with respect to the sample data. In an embodiment of the present invention, the data from one or more sources and a data warehouse is used to further perform data comparison, wherein the source data is used to calculate sample data for the data comparison test. In an embodiment of the present invention, a test script is created automatically based on the business rules pre-defined at the framework. In an embodiment of the present invention, the test script is executed. After which, data comparison is conducted between the DWH data and the sample data, based on the selected one or more data comparison strategies. The one or more data comparison strategies include but are not limited to, an exhaustive verification strategy, a sampling strategy, and an aggregation strategy. The one or more data comparison strategies are further explained in conjunction with FIG. 1

In an exemplary embodiment of the present invention, an exhaustive verification strategy may be used to perform data comparison test. One or more test scripts are created to execute the exhaustive verification strategy test case. The exhaustive verification strategy defines a methodology to compare each datum from the sample data to each datum from the DWH data (data stored at the data warehouse) to ascertain any error/irregularity in the data stored at the data warehouse. It may be apparent to a person skilled in the art that a combination of the abovementioned strategies may be applied to perform data comparison testing (data accuracy test) at the data warehouse.

At step 514, report of the executed test case is generated. After the data comparison test case is processed, a final report is generated to encapsulate the detailed output of the data comparison test. In an embodiment of the present invention, the report is further created in at least one of MS Excel format, PDF format, XML format and HTML format. In addition, the tester is enabled to save the created report manually at an external location. In another embodiment of the present invention, a summary report is also generated to highlight overall performance of the data comparison test conducted.

FIG. 6 is a screenshot illustrating an interface to develop a data quality analysis test case using a metadata analysis strategy, in accordance with an exemplary embodiment of the present invention. The screenshot illustrates an interface, which in turn is presented to a tester to define a metadata analysis strategy based test case and correspondingly execute it at the data warehouse. Various kinds of metadata analysis may be performed with the help of one or more validations available in the interface, based on the requirement of the data quality test. The one or more validations denoting the different kinds of metadata analysis, included in the screenshot are Primary Key Check, Foreign Key Check, Data Type Check, and Nullable Check. The interface includes dropdown buttons to receive input from the tester to select the schema and the corresponding database to be used. Further, the interface provides the tester with a list of various tables available in the schema, which then can be analyzed using metadata strategies. The tester is furthermore provided with various interactive options to select at least one validation corresponding to the metadata analysis strategy for further analysis. In an exemplary embodiment of the present invention, the tester selects three tables, which are labeled as 'CUSTOMERS', 'ACCOUNTS' and 'ACCOUNT_TYPES' to further test them, based on the selected validations.

Figure 7:
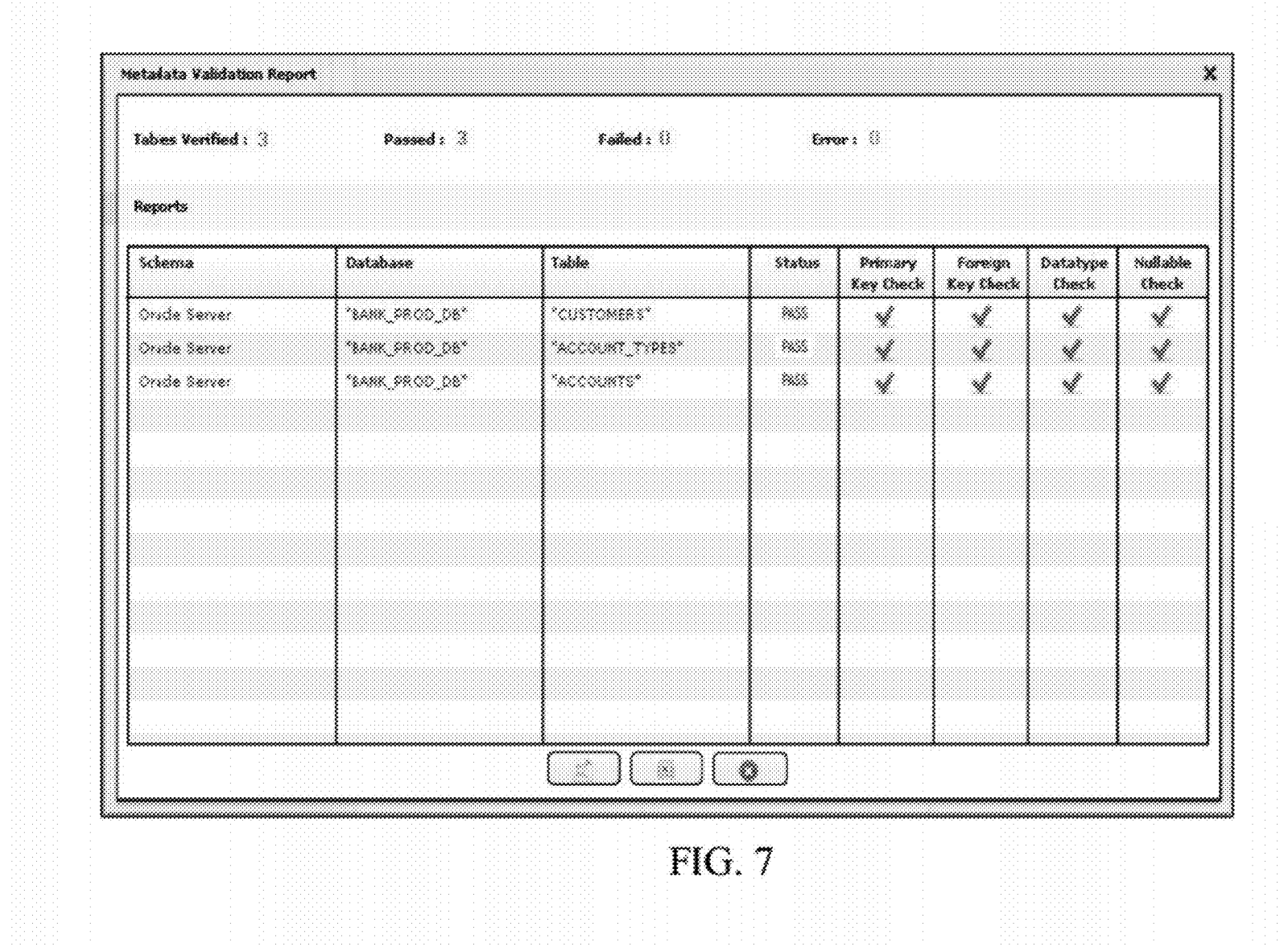

FIG. 7 is a screenshot illustrating the output of a data quality analysis test case executed at the data warehouse, wherein the test case uses metadata analysis strategy, in accordance with an exemplary embodiment of the present invention. The report outlines the output of the test conducted at the data warehouse. In an embodiment of the present invention, the report summarizes the outcome of the test conducted on the data (selected tables) included at the data warehouse. In an exemplary embodiment of the present invention, the screenshot 700 describes that three tables have been verified. The report further details the status of the test conducted and the respective validations checked at respective tables.

FIG. 8 is a screenshot illustrating an interface to develop a data quality analysis test case using a statistical analysis strategy, in accordance with an exemplary embodiment of the present invention. The screenshot illustrates an interface, which is presented to a tester to define a statistical analysis strategy based test case and correspondingly execute it at the data warehouse. The interface enables the tester to select the desired schema, database and the table at which he would like to perform the data quality analysis test. Further, the tester selects one or more columns at which he performs data quality analysis test with the help of statistical analysis strategy. The statistical analysis strategy includes various pre-defined functions which in turn are used to assess the data quality at the selected column. The various functions included in the statistical analysis strategy are minimum, maximum, average, sum, count, blank count, and min and max length. The tester selects one or more pre-defined functions based on the requirements of the test (testing of data at the data warehouse). In an exemplary embodiment of the present invention, to develop a test case a tester selects "BANK_PROD_DB" as the database and "ACCOUNTS" as the corresponding table at the interface. Thereafter, the tester selects columns "CURRENT BALANCE" (data type=number) and "MIN_BALANCE" (data type=number) as test data, wherein test data is the data, which the quality test case analyze. The tester may also selects "Min Value" and "Max Value" functions while creating the required test case.

FIG. 9 is a screenshot illustrating the output of a data quality analysis test case executed at the data warehouse, wherein the test case uses statistical analysis strategy, in accordance with an exemplary embodiment of the present invention. The exemplary screenshot of the output illustrates a summary report (in MS Excel format) which defines the key characteristics of the data quality analysis test (using the statistical analysis strategy) executed at the data warehouse. The key characteristics of the test performed, includes the start time of the test, the end time of the test, the total time required to process the test, the total number of checks performed by the test, the total number of columns checked by the test, the outliners check conducted by the test and the uniqueness check performed by the test.

FIG. 10 is a screenshot illustrating an interface to develop a data quality analysis test case using a relationship analysis strategy, in accordance with an exemplary embodiment of the present invention. The screenshot illustrates an interface, which in turn is presented to a tester to define relational arrangement between two or more entities in the data. This relational arrangement may be further defined as a parent-child relationship, in this case an entity, such as 'A' which is being referred to is called the parent, while an entity, such as 'B' which is referring to 'A' (parent) is called a child. The tester is enabled to check the number of single parent child and multiple parent child entity relationships present in the DWH data (data stored at a data warehouse) and further compare it to the sample data to perform data quality analysis test. The interface provides multiple text boxes to select source data along with its respective variables and corresponding DWH data along with its respective variables. Furthermore, the tester can also verify the cardinality of the relationship. In an exemplary embodiment of the present invention, the screenshot outlines a list of columns respective to a selected table. The tester selects the one or more columns to be tested. Thereafter, the tester selects the type of relational test to be executed. In an embodiment of the present invention, there are three types of relational test provided in the interface, 1:1, 1:M and 0:M.

FIG. 11 is a screenshot illustrating the output of a data quality analysis test case executed at the data warehouse, wherein the test case uses relationship analysis strategy, in accordance with an exemplary embodiment of the present invention. The exemplary screenshot is a report outlining the output of the data quality test (using the relational analysis strategy) executed at the data warehouse. The report outlines one or more details of the test conducted at the data warehouse. The details include the start time of the test, the end time of the test and the total time taken. Further, the report provides a detailed analysis of the test conducted on the selected columns.

FIG. 12 is a screenshot illustrating an interface to develop a data quality analysis test case using a pattern analysis strategy, in accordance with an exemplary embodiment of the present invention. The screenshot illustrates an interface, which is presented to a tester to define one or more patterns. The one or more patterns are used to identify differences in the DWH data and a sample data, wherein the sample data describes the required format of the data stored at the data warehouse. The patterns used for the analysis may include, Social Security Number (SSN), phone numbers, email address and so forth. Further, the tester is provided with various customization tools to customize the pre-stored patterns based on the requirements of the test, wherein the tester can specify the combination of characters to be used for the analysis. Moreover, the interface provides the tester with a text box, which displays the description of the generated/customized pattern, based on the requirements of the test. It may be appreciated by a person skilled in the art that patterns may be pre-stored in the framework or it may be defined based on the requirements of the data quality analysis test. In an exemplary embodiment of the present invention, the tester selects the pattern "Account no format 000XXXXX". Thereafter, the tester selects the column "ACCOUNT_NUMBER" on which the selected pattern check is to be applied.

FIG. 13 is a screenshot illustrating the output of a data quality analysis test case executed at the data warehouse, wherein the test case uses pattern analysis strategy, in accordance with an exemplary embodiment of the present invention. The exemplary screenshot is a report outlining the output of the data quality test (using the pattern analysis strategy) executed at the data warehouse. The report outlines one or more details of the test conducted at the data warehouse, wherein the details include the start time of the test, the end time of the test and the total time taken. Further, the report provides a detailed analysis of the test conducted on the selected columns.

Figure 14:
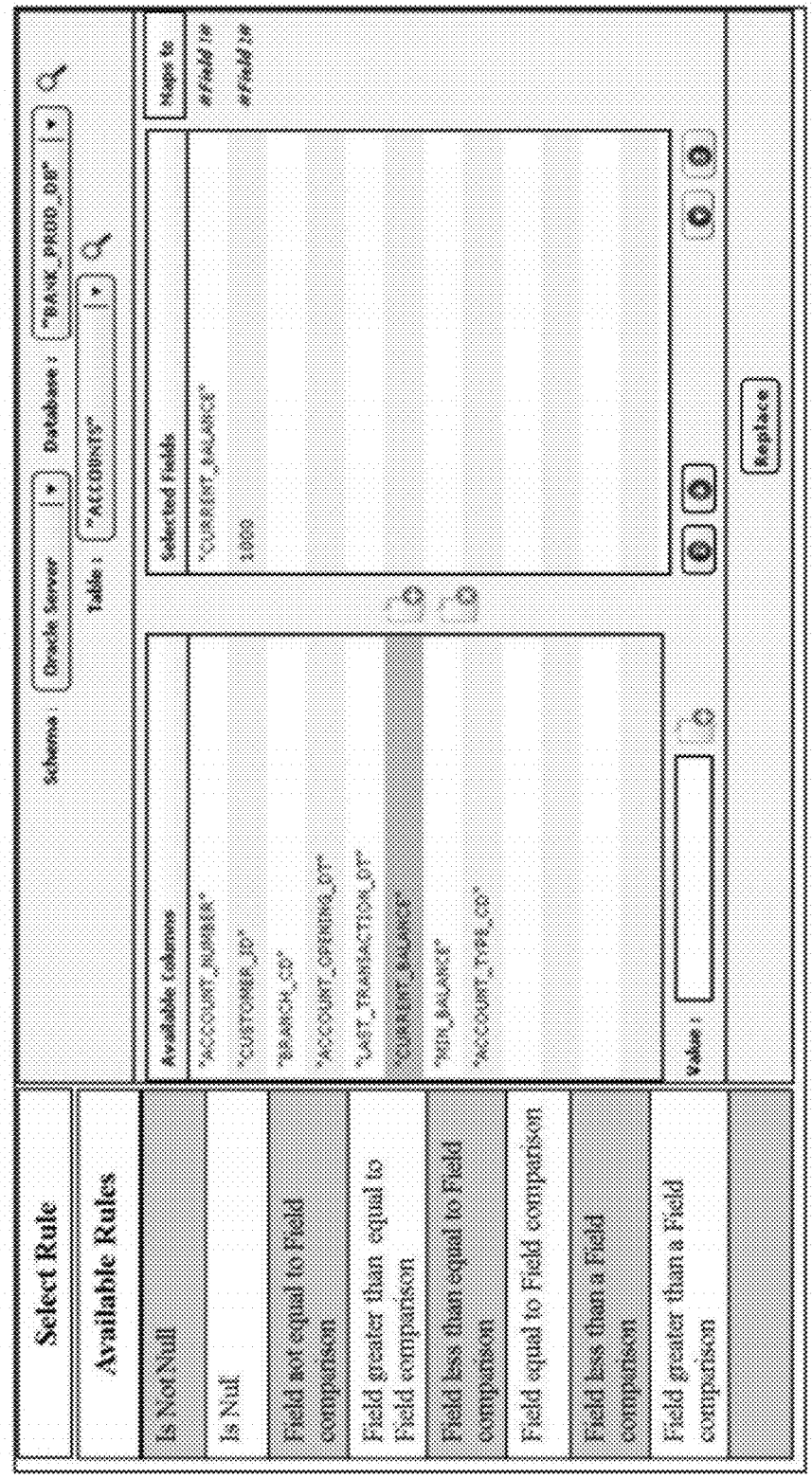
FIG. 14 is a screenshot illustrating an interface to develop a data quality analysis test using a business rules based strategy, in accordance with an exemplary embodiment of the present invention.

FIG. 14 is a screenshot illustrating an interface to develop a data quality analysis test using a business rules based strategy, in accordance with an exemplary embodiment of the present invention. The screenshot illustrates an interface to be presented to a tester to select various pre-defined business rules, which will be used to perform data quality analysis test at a data warehouse. The interface enables a tester to select pre-defined business rules and appropriately apply it to one or more selected columns of the sample data. A tester is also enabled to modify existing pre-defined business rules based on the requirement of the data quality test performed at a data warehouse. In an exemplary embodiment of the present invention, the screenshot outlines various business rules available to the tester. The tester further selects a business rule titled "Field greater than a Field comparison" business rule to further define the data quality analysis test case. After which the tester selects the corresponding fields to implement the data quality analysis test case, wherein the selected fields are "CURRENT_BALANCE" and "1000". The selected business rule along with the selected field implies that a check has to be performed to determine if the current balance is greater than 1000 for a corresponding account.

FIG. 15 is a screenshot illustrating the output of a data quality analysis test case executed at the data warehouse, wherein the test case uses business rules based strategy, in accordance with an exemplary embodiment of the present invention. The exemplary screenshot is a report outlining the output of the data quality test (using the business rules based strategy) executed at the data warehouse. The report outlines one or more details of the test conducted at the data warehouse, wherein the details include the start time of the test, the end time of the test and the total time taken. Further, the report provides a detailed analysis of the test conducted on the selected columns including the schema ("Oracle Server"), database ("BANK_PROD_DB") and table ("ACCOUNTS")

selected for the corresponding test. In exemplary embodiment of the present invention, the screenshot provides a data quality test, wherein the outcome of a business rule check is negative. The business rule checks for the account balance to be greater than 1000, but the balance in the account checked is 887 and therefore the result of the test is negative.

Figure 16:
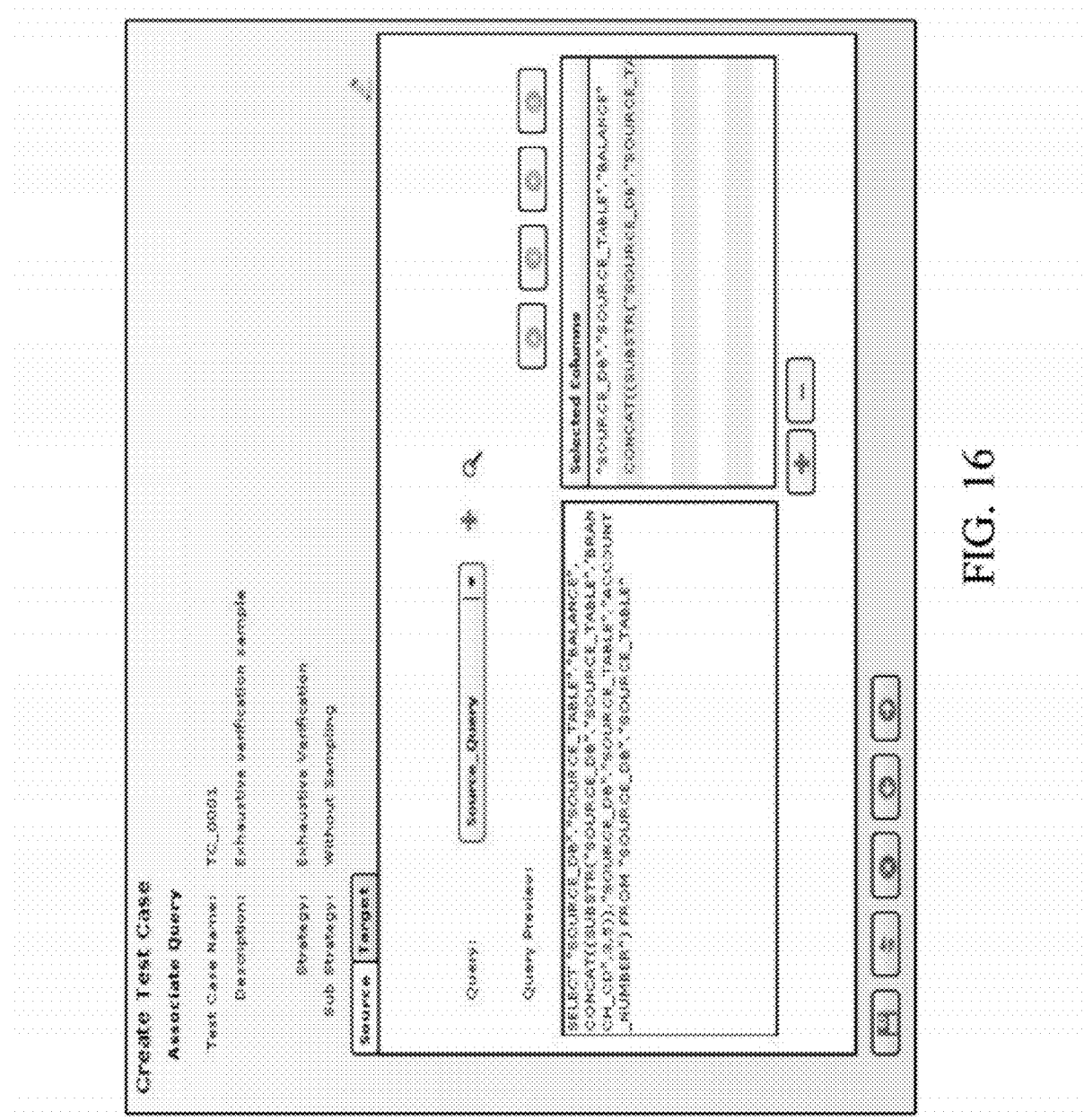
FIG. 16 is a screenshot illustrating an interface to develop a data comparison test case using an exhaustive verification strategy, in accordance with an exemplary embodiment of the present invention.

FIG. 16 is a screenshot illustrating an interface to develop a data comparison test case using an exhaustive verification strategy, in accordance with an exemplary embodiment of the present invention. The screenshot illustrates an interface to define a data comparison test case. The tester is enabled to select a source and a corresponding target, wherein the target refers to the location where the DWH data is stored and the source refers to the location of the sample data. The tester is further provided with preview text boxes where each text box provides a preview of the selected query and the selected columns respectively to perform exhaustive verification based data comparison test. In an exemplary embodiment of the present invention, the tester creates a test case called "TC_0001" for performing data comparison at the data warehouse. The tester further selects the strategy as "exhaustive verification strategy" to be used to create the data comparison test case. After which, the tester selects the respective, source and target data.

FIG. 17 is a screenshot illustrating the output of a data quality analysis test case executed at the data warehouse, wherein the test case uses exhaustive verification strategy, in accordance with an exemplary embodiment of the present invention. The exemplary screenshot is a report outlining the output of the data comparison test (using the exhaustive verification strategy) executed at the data warehouse. The report outlines various details of the test conducted at the data warehouse, wherein the details include, name of the test case, description of the test case, start time of the test, end time of the test, total time taken by the test and the status of the test. The report further provides a detailed description corresponding to each step taken during the data comparison test and a summary describing the numerical output of the test executed at the data warehouse, such as total source records, target records and so forth.

Figure 18:
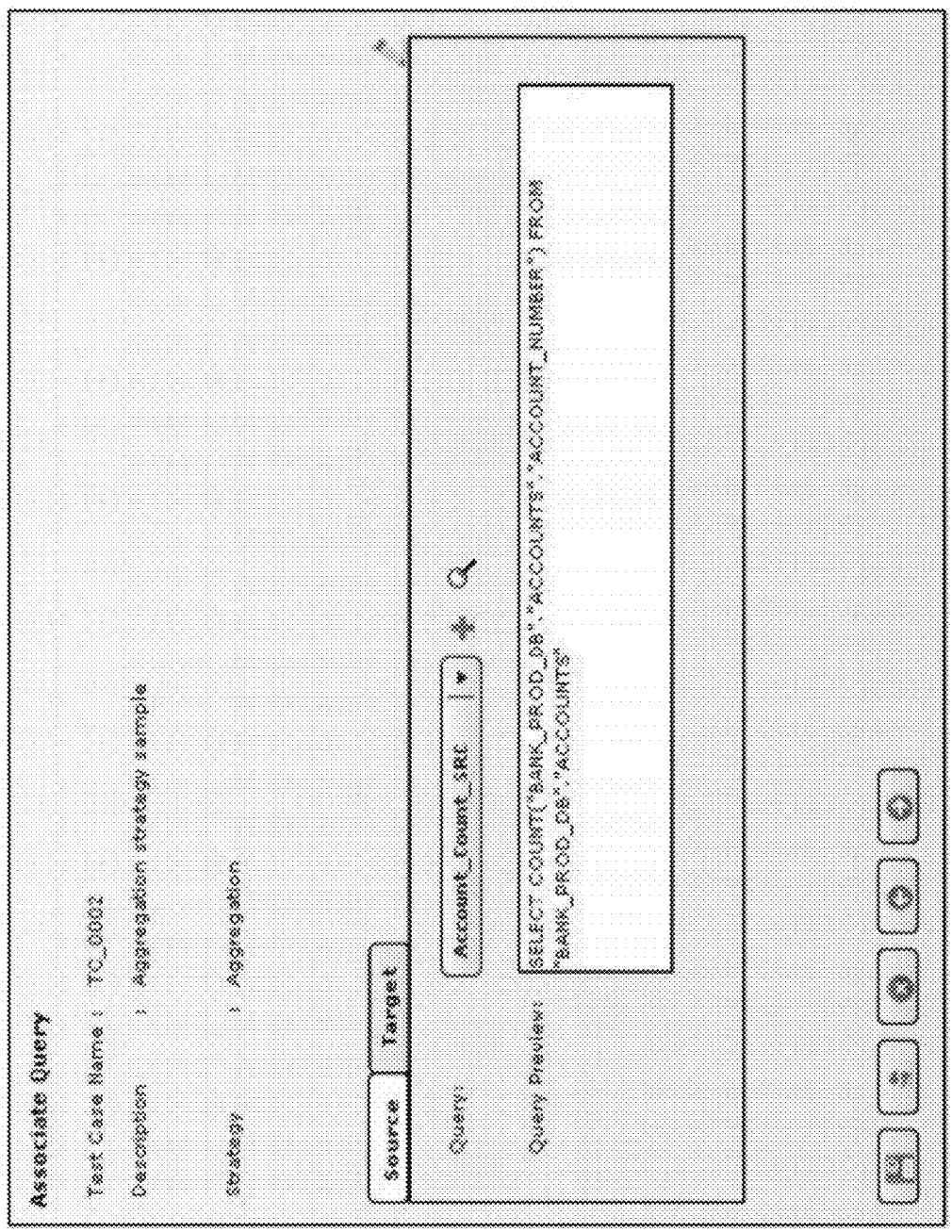
FIG. 18 is a screenshot illustrating an interface to develop a data comparison test case using an aggregation strategy, in accordance with an exemplary embodiment of the present invention.

FIG. 18 is a screenshot illustrating an interface to develop a data comparison test case using an aggregation strategy, in accordance with an exemplary embodiment of the present invention. The screenshot illustrates an interface to define a data comparison test case using aggregation strategy. The tester is provided with an interface through which the tester is enabled to select the source and the corresponding target for the data comparison test. Wherein, the target refers to the location where the DWH data is stored and the source refers to the location of the sample data. The tester is further provided with a dropdown menu, to select a query, and a preview text box, which presents the selected query to the tester. In an exemplary embodiment of the present invention, the tester creates a test case called "TC_0002" for performing data comparison at the data warehouse. The tester further selects the strategy as "aggregation strategy" to be used to create the data comparison test case. After which, the tester selects the respective, source and target data.

FIG. 19 is a screenshot illustrating the output of a data quality analysis test case executed at the data warehouse, wherein the test case uses aggregation strategy, in accordance with an exemplary embodiment of the present invention. The exemplary screenshot is a report outlining the output of the data comparison test (using the aggregation strategy) executed at the data warehouse. The report outlines various details of the test conducted at the data warehouse, wherein the details include, name of the test case, description of the test case, start time of the test, end time of the test, total time taken by the test and the status of the test. The report further provides a detailed description corresponding to each step performed during the data comparison test.

Various embodiments of the present invention, may be implemented via one or more systems/computing devices. The computing device is not intended to suggest any limitation as to scope of use or functionality of described embodiments. The computing device includes at least one processor and memory. The processor executes computer-executable instructions and may be a real or a virtual processor. In an embodiment of the present invention, the memory may store software for implementing various embodiments of the present invention.

The present invention may be implemented in numerous ways including as an apparatus, method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

The invention claimed is:

1. A computer-implemented method for performing end-to-end testing of data stored at a data warehouse, the method comprising:
presenting to a tester, a plurality of pre-defined testing strategies for checking at least one of accuracy and quality of data stored in the data warehouse,
wherein the data stored in the data warehouse is derived by subjecting data from at least one source database to at least one transformation function,
wherein each of the plurality of pre-defined testing strategies defines a methodology to validate data stored in the data warehouse against sample data derived from a source database, wherein the sample data has been subjected to the same transformation logic that was used while storing data in the data warehouse, and
wherein the plurality of pre-defined testing strategies include, for identifying differences between data stored in the data warehouse and the sample data, at least two of:
an exhaustive data comparison strategy that compares each datum stored at the data warehouse with a corresponding sample datum within the sample data,
a sampling data comparison strategy that compares a selected set of data stored at the data warehouse with a corresponding set of the sample data, and
an aggregation comparison strategy that compares a collection of aggregated elements within data stored at the data warehouse with a corresponding collection of aggregated elements within the sample data;
receiving input from the tester via a user interface on a computing device, t h e input identifying at least one testing requirement defining an attribute of the test;
receiving input from the tester via the user interface, further identifying at least one predefined testing strategy from among the plurality of predefined testing strategies;
developing, using a computing device, at least one test case for validating data stored in the data warehouse against sample data, based on (i) the identified at least one testing requirement and on (ii) the identified at least one predefined strategy;

creating one or more scripts for executing the at least one test case at the data warehouse;
defining a business rule for checking the validity of the data at the data warehouse;
comparing the data stored at the data warehouse to a sample data for verifying the accuracy of the data;
generating the sample data with the help of one or more transformation logics, wherein the sample data is used to identify error in the data stored at the data warehouse;
analyzing the quality of the data stored at the data warehouse;
executing, using a computing device, the developed at least one test case based on at least one predefined execution rule to produce output results, wherein the predefined execution rule is assigned by the tester; and
generating a result encapsulating the output of the executed at least one test case at the data warehouse; and
generating a report, using a computing device, encompassing output results of the end-to-end testing of data.

2. The computer-implemented method of claim 1, wherein at least one of the identified predefined strategies is a data comparison strategy for comparing and identifying differences between data stored at the data warehouse and sample data derived from a source database, wherein the sample data has been subjected to the same transformation logic that was used while storing data in the data warehouse.

3. The computer-implemented method of claim 1, wherein the report generated outlines the information related to execution of steps and the output results corresponding to each step involved in the end-to-end testing of data at the data warehouse.

4. The computer-implemented method of claim 1, wherein generating a report encompassing the output results of the end-to-end testing of data at the data warehouse further comprises creating a summary of the end-to-end testing of data at the data warehouse, in which the summary highlights the output results of the one or more test cases executed at the data warehouse and identifies any error encountered during the execution of the one or more test cases.

5. The computer-implemented method of claim 1, wherein at least one of the identified predefined strategies is a metadata analysis strategy, comprising verification of table and column definitions of data stored at the data warehouse against corresponding definitions for sample data derived from a source database.

6. The computer-implemented method of claim 1, wherein at least one of the identified predefined strategies is a statistical analysis strategy for verifying data consistency, comprising a comparison of statistics calculated based on data stored at the data warehouse against corresponding statistics calculated based on sample data derived from a source database, wherein data stored at the data warehouse has been derived from data stored at said source database.

7. The computer-implemented method of claim 1, wherein at least one of the identified predefined strategies is a relationship analysis strategy, comprising a comparison of child-parent relationships within data stored at the data warehouse against child-parent relationships within sample data derived from a source database, for verifying consistency.

8. The computer-implemented method of claim 1, wherein at least one of the identified predefined strategies is a pattern analysis strategy, comprising comparison of a format in which data has been stored at the data warehouse against a pre-defined data format, for verifying consistency.

9. The computer-implemented method of claim 1, wherein the plurality of pre-defined testing strategies check for both accuracy and quality of data stored in the data warehouse.

10. A system for performing end-to-end testing of data stored at a data warehouse, the system comprising:
a strategy component, in communication with a hardware processor, configured to present to a tester, a plurality of pre-defined testing strategies for checking at least one of accuracy and quality of data stored in the data warehouse,
wherein the data stored in the data warehouse is derived by subjecting data from at least one source database to at least one transformation function, and
wherein each of the plurality of pre-defined testing strategies defines a methodology to validate data stored in the data warehouse against sample data, and
wherein the plurality of pre-defined testing strategies include, for identifying differences between data stored in the data warehouse and the sample data, and wherein the plurality of pre-defined testing strategies include, for identifying differences between data stored in the data warehouse and the sample data, at least two of:
an exhaustive data comparison strategy that compares each datum stored at the data warehouse with a corresponding sample datum within the sample data,
a sampling data comparison strategy that compares a selected set of data stored at the data warehouse with a corresponding set of the sample data, and
an aggregation comparison strategy that compares a collection of aggregated elements within data stored at the data warehouse with a corresponding collection of aggregated elements within the sample data;
a test life cycle component, in communication with the hardware processor, configured to:
receive input from the tester via a user interface, the input identifying at least one testing requirement defining an attribute of the test; and
receive input from the tester via the user interface, further identifying at least one predefined testing strategy from among the plurality of predefined testing strategies; and develop at least one test case for validating data stored in the data warehouse against sample data, based on (i) the identified at least one testing requirements and on (ii) the identified at least one predefined strategy; and
a test automation component, in communication with the hardware processor, configured to:
execute the developed at least one test case based on at least one predefined execution rule to produce output results; and
generate a report, encompassing the output results of the end-to-end testing of data,
wherein the test automation component comprises:
a query builder, in communication with the hardware processor, configured to create one or more scripts for executing the at least one test case at the data warehouse;
a business rule builder, in communication with the hardware processor, configured to define a business rule for checking the validity of the data at the data warehouse;
a data comparison module, in communication with the hardware processor, configured to compare the data stored at the data warehouse to a sample data for verifying the accuracy of the data;
a test data generator module, in communication with the hardware processor, configured to generate the sample data with the help of one or more transformation logics, wherein the sample data is used to identify error in the data stored at the data warehouse;

a data quality analyzer module, in communication with the hardware processor, configured to analyze the quality of the data stored at the data warehouse;

an execution engine, in communication with the hardware processor, configured to execute the at least one test case based on a predefined execution rule, wherein the predefined execution rule is assigned by the tester; and a reporting engine, in communication with the hardware processor, configured to generate a result encapsulating the output of the executed at least one test case at the data warehouse.

11. The system of claim 10, wherein the strategy component further comprises:

a data comparison strategy component configured to provide a data comparison strategy for comparing and identifying differences between data stored at the data warehouse and sample data derived from a source database, wherein the sample data has been subjected to the same transformation logic that was used while storing data in the data warehouse.

12. The system of claim 11, wherein the data comparison strategy comprises one of an exhaustive comparison strategy, a sampling comparison strategy, and an aggregation comparison strategy.

13. The system of claim 10, wherein the strategy component further comprises a data quality analysis strategy component configured to provide a metadata quality analysis strategy for verifying table and column definitions of data stored at the data warehouse against corresponding definitions for sample data derived from a source database.

14. The system of claim 10, wherein the strategy component further comprises a data quality analysis strategy component configured to provide a statistical analysis strategy for verifying data consistency, the statistical analysis strategy comprising comparing statistics calculated based on data stored at the data warehouse against corresponding statistics calculated based on sample data derived from a source database, wherein data stored at the data warehouse has been derived from data stored at said source database.

15. The system of claim 10, wherein the strategy component further comprises a data quality analysis strategy component configured to provide a relationship analysis strategy for comparing child-parent relationships within data stored at the data warehouse against child-parent relationships within sample data derived from a source database, for verifying consistency.

16. The system of claim 10, wherein the strategy component further comprises a data quality analysis strategy component configured to provide a pattern analysis strategy for comparing a format in which data has been stored at the data warehouse against a pre-defined data format, for verifying consistency.

17. A computer program product comprising a non-transitory computer readable storage medium having a computer-readable program code embodied thereon to perform end-to-end testing of data stored at a data warehouse, the computer-readable program code comprising instructions that, when executed by a computing device, cause the computing device to:

presenting to a tester a plurality of pre-defined testing strategies for checking at least one of accuracy and quality of data stored in the data warehouse, wherein the data stored in the data warehouse is derived by subjecting data from at least one source database to at least one transformation function, wherein each of the plurality of pre-defined testing strategies defines a methodology to validate data stored in the data warehouse against sample data derived from a source database, wherein the sample data has been subjected to the same transformation logic that was used while storing data in the data warehouse, and wherein the plurality of pre-defined testing strategies include, for identifying differences between data stored in the data warehouse and the sample data, at least two of:

an exhaustive data comparison strategy that compares each datum stored at the data warehouse with a corresponding sample datum within the sample data, a sampling data comparison strategy that compares a selected set of data stored at the data warehouse with a corresponding set of the sample data, and an aggregation comparison strategy that compares a collection of aggregated elements within data stored at the data warehouse with a corresponding collection of aggregated elements within the sample data;

receive input from the tester, the input identifying at least one testing requirement, defining an attribute of the test;

receiving input from the tester via the user interface, further identifying at least one predefined testing strategy from among the plurality of predefined testing strategies;

develop at least one test case for validating data stored in the data warehouse against sample data, based on (i) the identified at least one testing requirement and on (ii) the at least one predefined strategy;

create one or more scripts for executing the at least one test case at the data warehouse;

define a business rule for checking the validity of the data at the data warehouse;

compare the data stored at the data warehouse to a sample data for verifying the accuracy of the data;

generate the sample data with the help of one or more transformation logics, wherein the sample data is used to identify error in the data stored at the data warehouse;

analyze the quality of the data stored at the data warehouse;

execute the developed at least one or more test cases based on at least one predefined execution rule to produce output results, wherein the predefined execution rule is assigned by the tester; and generate a result encapsulating the output of the executed at least one test case at the data warehouse; and generate a report encompassing the output results of the end-to-end testing of data.

18. The computer program product of claim 17, wherein at least one of the identified predefined strategies is a data comparison strategy for comparing and identifying differences between data stored at the data warehouse and sample data derived from a source database, wherein the sample data has been subjected to the same transformation logic that was used while storing data in the data warehouse.

19. The computer program product of claim 18, wherein the data comparison strategy includes one of an exhaustive comparison strategy, a sampling comparison strategy, and an aggregation comparison strategy.

20. The computer program product of claim 17, wherein at least one of the identified predefined strategies is a metadata analysis strategy, comprising verification of table and column definitions of data stored at the data warehouse against corresponding definitions for sample data derived from a source database.

21. The computer program product of claim 17, wherein at least one of the identified predefined strategies is a statistical analysis strategy for verifying data consistency, comprising a comparison of statistics calculated based on data stored at the data warehouse against corresponding statistics calculated based on sample data derived from a source database, wherein data stored at the data warehouse has been derived from data stored at said source database.

22. The computer program product of claim 17, wherein at least one of the identified predefined strategies is a relationship analysis strategy, comprising a comparison of child-parent relationships within data stored at the data warehouse against child-parent relationships within sample data derived from a source database, for verifying consistency.

23. The computer program product of claim 17, wherein at least one of the identified predefined strategies is a pattern analysis strategy, comprising comparison of a format in which data has been stored at the data warehouse against a pre-defined data format, for verifying consistency.

* * * * *